United States Patent
Jung et al.

(10) Patent No.: US 11,624,699 B2
(45) Date of Patent: Apr. 11, 2023

(54) MEASUREMENT SYSTEM CAPABLE OF ADJUSTING AOI, AOI SPREAD AND AZIMUTH OF INCIDENT LIGHT

(71) Applicant: SAMSUNG ELECTRONICS CO., LTD., Suwon-si (KR)

(72) Inventors: Jaehwang Jung, Suwon-si (KR); Wookrae Kim, Suwon-si (KR); Myoungki Ahn, Yongin-si (KR); Changhyeong Yoon, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 8 days.

(21) Appl. No.: 17/081,568

(22) Filed: Oct. 27, 2020

(65) Prior Publication Data
US 2021/0364420 A1 Nov. 25, 2021

(30) Foreign Application Priority Data
May 25, 2020 (KR) .................. 10-2020-0062608

(51) Int. Cl.
*G01N 21/21* (2006.01)
*G01N 21/95* (2006.01)

(52) U.S. Cl.
CPC ....... *G01N 21/211* (2013.01); *G01N 21/9501* (2013.01); *G01N 2021/213* (2013.01); *G01N 2021/214* (2013.01)

(58) Field of Classification Search
None
See application file for complete search history.

(56) References Cited

U.S. PATENT DOCUMENTS

| | | | |
|---|---|---|---|
| 6,504,608 B2 | 1/2003 | Hallmeyer et al. | |
| 7,106,425 B1* | 9/2006 | Bultman | G01N 21/9501 356/73 |
| 7,327,450 B2 | 2/2008 | Kreh et al. | |
| 7,397,553 B1* | 7/2008 | Mehanian | G01B 11/303 356/369 |
| 8,253,940 B1* | 8/2012 | Green | G01N 21/211 356/369 |
| 9,285,687 B2 | 3/2016 | Smirnov et al. | |
| 9,310,290 B2 | 4/2016 | Wang et al. | |
| 9,952,140 B2 | 4/2018 | Wang et al. | |
| 10,215,693 B2 | 2/2019 | Krishnan et al. | |
| 10,215,712 B2 | 2/2019 | Wolters et al. | |
| 2004/0100632 A1* | 5/2004 | Piwonka-Corle | G01N 21/211 356/364 |

(Continued)

FOREIGN PATENT DOCUMENTS

KR 20170104245 A * 9/2017 .......... G01N 21/211
KR 10-1863752 B1 6/2018

*Primary Examiner* — Rufus L Phillips
(74) *Attorney, Agent, or Firm* — Sughrue Mion, PLLC

(57) ABSTRACT

A measurement system is disclosed. A measurement system includes an illumination module, a mirror module, a stage, and a detector. The illumination module includes a light source, an optical fiber, a collimating mirror, a polarization state generator, a beam control mirror, and a relay mirror. The mirror module includes a first beam splitter and a reflective objective mirror. The beam control mirror is movable to relay light received from the polarization state generator to various positions on the relay mirror.

17 Claims, 18 Drawing Sheets

(56) References Cited

U.S. PATENT DOCUMENTS

| | | | |
|---|---|---|---|
| 2006/0268271 A1* | 11/2006 | Liphardt | G01J 4/00 |
| | | | 356/369 |
| 2014/0375981 A1* | 12/2014 | Wang | G01N 21/956 |
| | | | 356/51 |
| 2018/0073979 A1* | 3/2018 | Cho | H04N 5/247 |
| 2018/0088040 A1* | 3/2018 | Krishnan | G01J 3/2803 |
| 2018/0164227 A1 | 6/2018 | Kim et al. | |
| 2019/0103248 A1 | 4/2019 | Niu et al. | |
| 2019/0369374 A1 | 12/2019 | Forcht et al. | |

* cited by examiner

MEASUREMENT SYSTEM CAPABLE OF ADJUSTING AOI, AOI SPREAD AND AZIMUTH OF INCIDENT LIGHT

CROSS-REFERENCE TO THE RELATED APPLICATION

This application claims priority from Korean Patent Application No. 10-2020-0062608, filed on May 25, 2020, in the Korean Intellectual Property Office, the disclosure of which is incorporated by reference herein in its entirety.

BACKGROUND

1. Field

The present disclosure relates to a measurement system capable of adjusting an angle of incidence (AOI), an AOI spread and an azimuth of incident light, a method for adjusting an AOI, an AOI spread and an azimuth, and a method for measuring a sample using the measurement system.

2. Description of the Related Art

In existing related art imaging spectral ellipsometry apparatus, light having a fixed angle of incidence (AOI) is used. In an ellipsometry method, there is a trade-off between spectral sensitivity and image resolution varying in accordance with an AOI of light. Furthermore, light having broadband wavelengths cannot be used due to chromatic aberration caused by refraction because a lens is used. For this reason, in existing related art imaging spectral ellipsometry process, it is difficult to obtain measurement result data having superior measurement sensitivity and resolution.

SUMMARY

It is an aspect to enhance accuracy and reliability of an imaging spectral ellipsometry process.

It is another aspect to provide superior spectral sensitivity and superior image resolution in an imaging spectral ellipsometry process.

It is yet another aspect to provide methods for obtaining optimum conditions in an imaging spectral ellipsometry process through adjustment of an angle of incidence (AOI), an AOI spread and an azimuth of light.

It is another aspect to provide an imaging spectral ellipsometry system capable of adjusting an AOI, an AOI spread and an azimuth of light.

It is another aspect to provide a method for adjusting an AOI, an AOI spread and an azimuth of light in an imaging spectral ellipsometry system.

According to an aspect of one or more exemplary embodiments, there is provided a measurement system comprising an illumination module comprising a light source, an optical fiber, a collimating mirror, a polarization state generator, a beam control mirror, and a relay mirror; a mirror module comprising a first beam splitter and a reflective objective mirror; a stage; and a detector, wherein the beam control mirror is movable to relay light received from the polarization state generator to a plurality of positions on the relay mirror.

According to another aspect of one or more exemplary embodiments, there is provided a measurement system comprising an illumination module comprising a light source, an optical fiber, a collimating mirror, a polarization state generator, a beam control mirror, and a relay mirror; a mirror module comprising a beam splitter and a reflective objective mirror; a stage; and a detector. The light source generates light, and provides the light to the collimating mirror via the optical fiber, the collimating mirror converts the light received from the light source into straight light, and provides the straight light to the polarization state generator, the polarization state generator polarizes the straight light received from the collimating mirror, and provides the polarized light to the beam control mirror, the beam control mirror relays the polarized light received from the polarization state generator to the relay mirror, and the beam control mirror and the relay mirror in combination converts the polarized light received from the polarization state generator into focal light, and provides the focal light to the mirror module.

According to another aspect of one or more exemplary embodiments, there is provided a measurement system comprising an illumination module comprising a light source, an optical fiber, a collimating mirror, a polarization state generator, a beam control mirror, and a relay mirror; a mirror module comprising a beam splitter and a reflective objective mirror, the reflective objective mirror comprising a convex mirror and a concave mirror and the convex mirror is below the concave mirror in a direction of incidence of light from the beam splitter; a stage; and a detector. The light source generates light, and provides the light to the optical fiber, the optical fiber adjusts an angle-of-incidence spread of the light, and provides the adjusted light to the collimating mirror, the collimating mirror converts the light into straight light, and provides the straight light to the polarization state generator, the polarization state generator polarizes the straight light received from the collimating mirror, and provides the polarized light to the beam control mirror, the beam control mirror relays the polarized light to the relay mirror, the beam control mirror and the relay mirror in combination converts the polarized light into focal light, and provides the focal light to the beam splitter of the mirror module, the beam splitter provides the light received from the illumination module to the reflective objective mirror, a first half portion of the convex mirror and a first half portion of the concave mirror exclusively provide light received from the illumination module to the stage, and a second half portion of the convex mirror and a second half portion of the concave mirror exclusively reflect, onto the detector, light reflected from the stage.

BRIEF DESCRIPTION OF THE DRAWINGS

The above and other aspects will be described with reference to the drawings, in which.

DETAILED DESCRIPTION

In the specification, the term "straight light" denotes light directed in a particular direction or directed to a target without being radiated. For example, straight light may have a focal point disposed at infinity. The term "focal light" denotes converging light and diverging light directed such that the light has a focal point/

Figure 1:
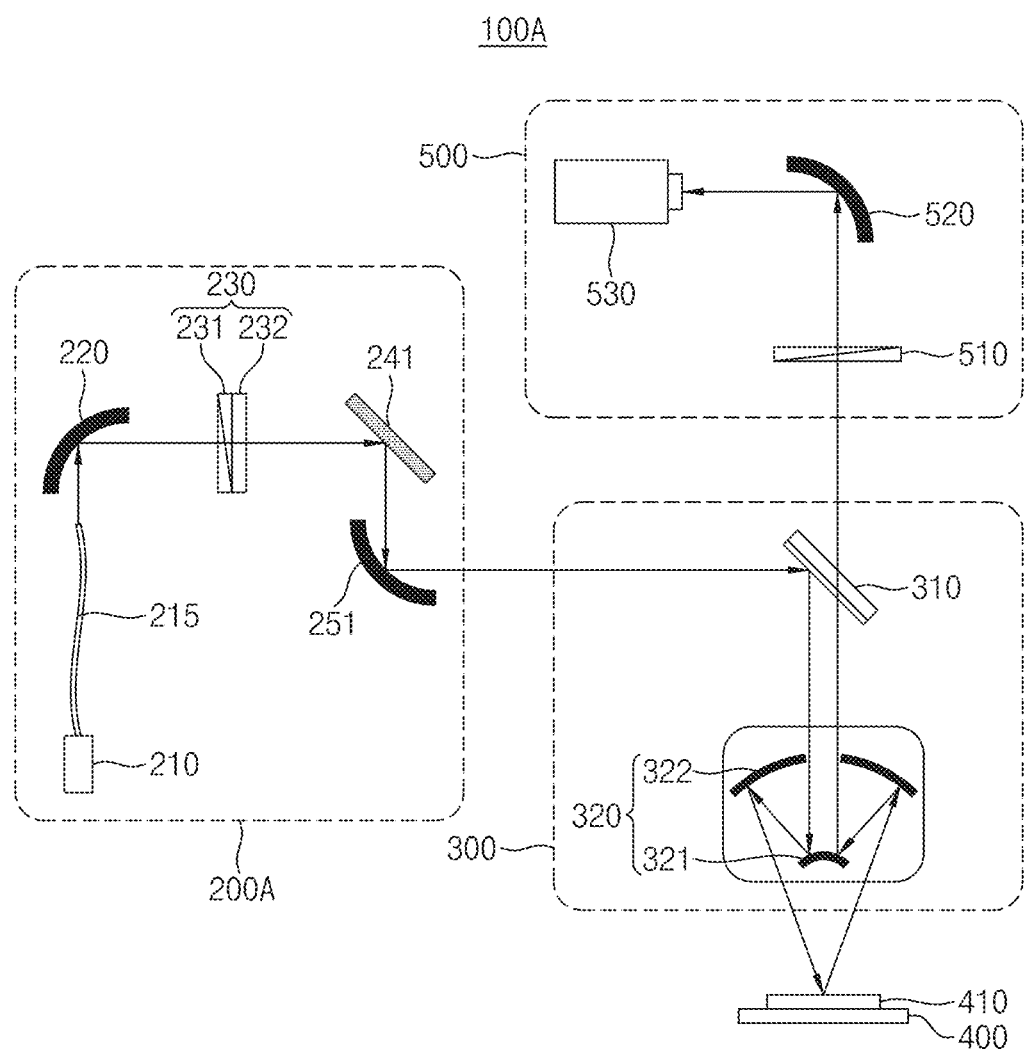
FIG. 1 is a diagram schematically showing a measurement system according to an exemplary embodiment.

FIG. 1 is a diagram schematically showing a measurement system according to an exemplary embodiment. Referring to FIG. 1, a measurement system 100A may include an illumination module 200A, a mirror module 300, a stage 400, and a detector 500. Arrows may denote advance paths of light. That is, the arrows in the figures illustrate how the light advances along a path.

The illumination module 200A may provide light to the mirror module 300. The illumination module 200A may include a light source 210, an optical fiber 215, a collimating mirror 220, a polarization state generator (PSG) 230, a beam control mirror 241, and a relay mirror 251.

In some embodiments, the light source 210 may include a monochromator. The light source 210 may selectively generate monochromatic light such as infrared light, visible light and/or ultraviolet light. The light source 210 may generate light having various wavelengths in a range of about 180 nm to about 20,000 nm. For example, the light source 210 may generate light having various wavelengths in a range of ultraviolet (UV), visible light and/or infrared (IR) wavelengths, and may provide the generated light to the collimating mirror 220. That is, the light source may selectively generate light having an appropriate wavelength in accordance with a measurement feature. The optical fiber may transmit light Ls (see, e.g., FIGS. 2A, 2B) from the light source 210 to the collimating mirror 220.

The collimating mirror 220 may provide, to the polarization state generator 230, the light provided from the light source 210 via the optical fiber 215. For example, in some embodiments, the collimating mirror 220 may include a concave mirror. In some embodiments, the collimating mirror 220 may include a flat mirror. Light passing through the optical fiber 215 and reflected by the collimating mirror 220 may be straight light including collimated light and/or quasi-collimated light.

The polarization state generator 230 may include a polarizer 231 and a compensator 232. The polarizer 231 may primarily polarize light received from the collimating mirror 220. For example, primarily-polarized light may be light in a linearly polarized state. The compensator 232 may secondarily polarize the primarily-polarized light. For example, the compensator 232 may convert light in a linearly polarized state into light in an elliptically polarized state. Accordingly, the polarization state generator 230 may convert non-polarized light into light polarized in a certain state, and may provide the polarized light to the beam control mirror 241.

The beam control mirror 241 may provide the polarized light received from the polarization state generator 230 to various positions of the relay mirror 251 through reflection of the polarized light.

The relay mirror 251 may provide the light received from the beam control mirror 241 to the mirror module 300 through reflection of the light. In some embodiments, the relay mirror 251 may include a concave mirror. The relay mirror 251 may convert straight light into focal light having a focal point or may convert focal light into straight light. The combination of the beam control mirror 241 and the relay mirror 251 may convert straight light into focal light.

The mirror module 300 may provide light received from the illumination module 200A to a test sample 410 on the stage 400, and may provide light reflected from the test sample 410 to the detector 500.

The mirror module 300 may include a first beam splitter 310 and a reflective objective mirror 320. The first beam splitter 310 may reflect light received from the relay mirror 251 to the reflective objective mirror 320, and may provide light received from the reflective objective mirror 320 to the detector 500.

The reflective objective mirror 320 may include a lower mirror, that is, a convex mirror 321, and an upper mirror, that is, a concave mirror 322. The convex mirror 321 may reflect light received from the first beam splitter 310 to the concave mirror 322, or may reflect light reflected from the concave mirror 322 to the first beam splitter 310. The concave mirror 322 may reflect light received from the convex mirror 321 to the test sample 410 on the stage 400, or may reflect light reflected from the test sample 410 to the convex mirror 321. Light provided from the convex mirror 321 to the first beam splitter 310 may pass through the first beam splitter 310 and be irradiated onto the detector 500. The reflective objective mirror 320 may be moved upwards or downwards.

The stage 400 may support the test sample 410, and the stage 400 may move. For example, the stage 400 may move in forward, rearward, left and right directions for a scanning operation. In addition, the stage 400 may move upwards and downwards for focusing. In other words, the stage 400 may move in six directions. The stage 420 also may perform rotation. For example, the test sample 410 may include a semiconductor wafer. The stage 400 may perform upward and downward movement.

The detector 500 may include a polarization state analyzer (PSA) 510, an imaging mirror 520, and an imaging camera 530. The polarization state analyzer 510 may analyze a polarization state of light received from the first beam splitter 310 and, as such, may transmit light of a specific polarization state therethrough. For example, the polarization state analyzer 510 may be one of various optical filters. The polarization state analyzer 510 may also include a portion having a polarization function and a portion having a compensation function, as in the polarization state generator 310. The imaging mirror 520 may reflect light received from the polarization state analyzer 510 to the imaging camera 530. The imaging mirror 520 may reflect straight light in the form of focal light or may reflect focal light in the form of straight light. For example, the imaging mirror 520 may include a concave mirror. Accordingly, the imaging mirror 520 may convert straight light into focal light, or may convert focal light into straight light. In an embodiment, the imaging mirror 520 may include a flat mirror. The imaging camera 530 may capture light irradiated from the imaging mirror 510, and may then produce an image from the captured light. The captured image may be converted into an image file by the imaging camera 530, and may be displayed on a display such as a computer monitor.

Figure 2A:
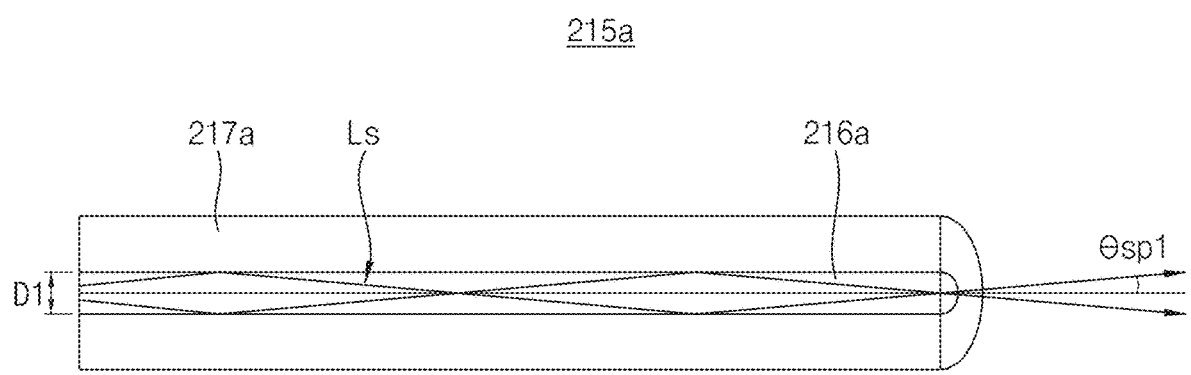
FIGS. 2A and 2B are diagrams showing formation and adjustment of angle of incidence (AOI) spreads by optical fibers in the measurement system of FIG. 1, according to an exemplary embodiment.
Figure 2B:
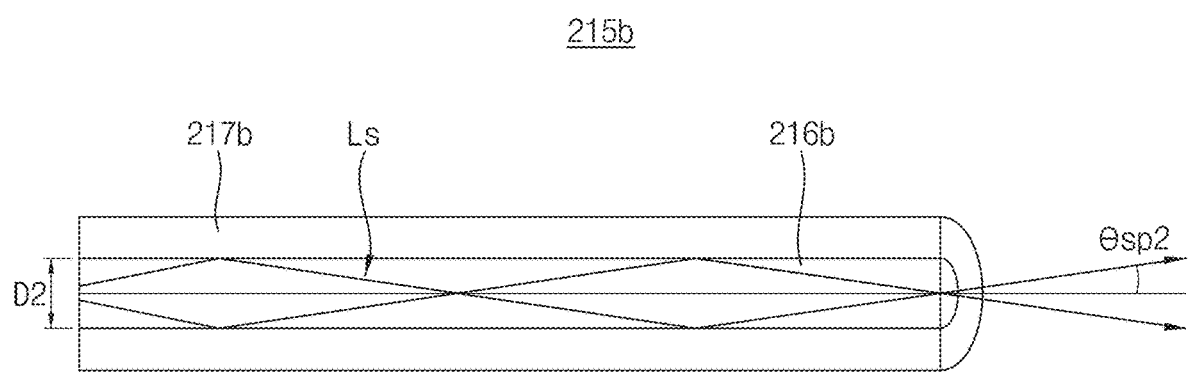

FIGS. 2A and 2B are diagrams showing formation and adjustment of angle of incidence (AOI) spreads by optical fibers in the measurement system of FIG. 1, according to an exemplary embodiment.

Referring to FIGS. 2A and 2B, optical fibers 215a and 215b in the measurement system 100A may include respective cores 216a and 216b, and respective claddings 217a and 217b. The cores 216a and 216b may have a transparent cylindrical shape. The claddings 217a and 217b may surround the cores 216a and 216b in the form of cylinders, respectively, and may have lower reflective indexes than the cores 216a and 216b, respectively. Accordingly, total reflection of light may occur at boundary surfaces between respective cores 216a and 216b and respective claddings 217a and 217b and, as such, light Ls may pass through interiors of the cores 216a and 216b. Formation and adjustment of AOI spreads θsp1 and θsp2 of the light Ls may be possible through adjustment of respective diameters D1 and D2 of the cores 216a and 216b. For example, the AOI spreads θsp1 and θsp2 of the light Ls may be defined by angles formed with respect to a virtual line passing through centers of the cores 216a and 216b, respectively. The AOI spread θsp1 of the light Ls formed by the core 216a having a relatively small diameter, that is, the diameter D1, may be relatively smaller than the AOI spread θsp2 of the light Ls formed by the core 216b having a relatively large diameter, that is, the diameter D2. The AOI spreads θsp1 and θsp2 may influence measurement sensitivity.

Figure 3A:
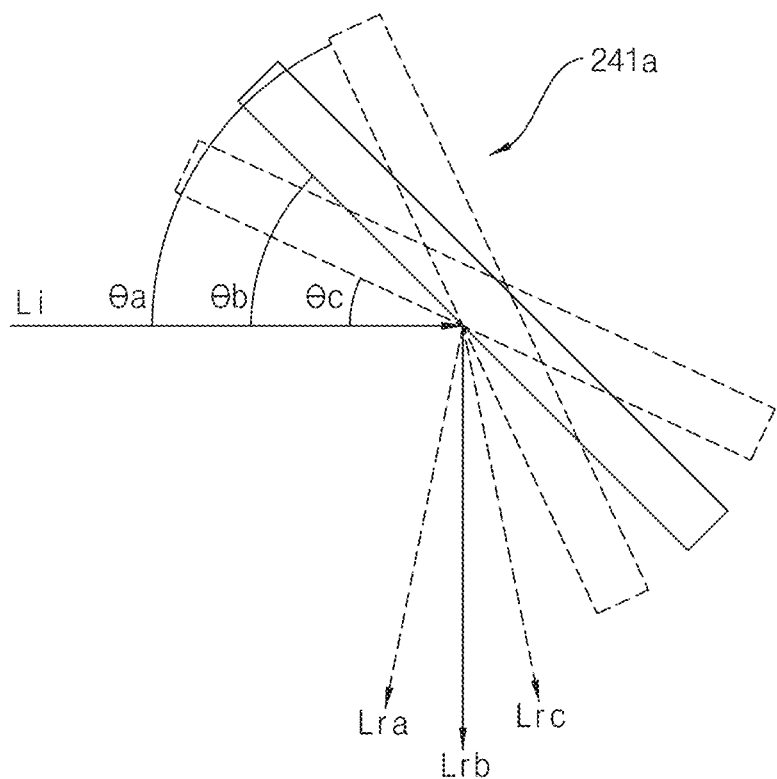
FIGS. 3A and 3B are diagrams showing beam control mirrors, according to various exemplary embodiments.
Figure 3B:
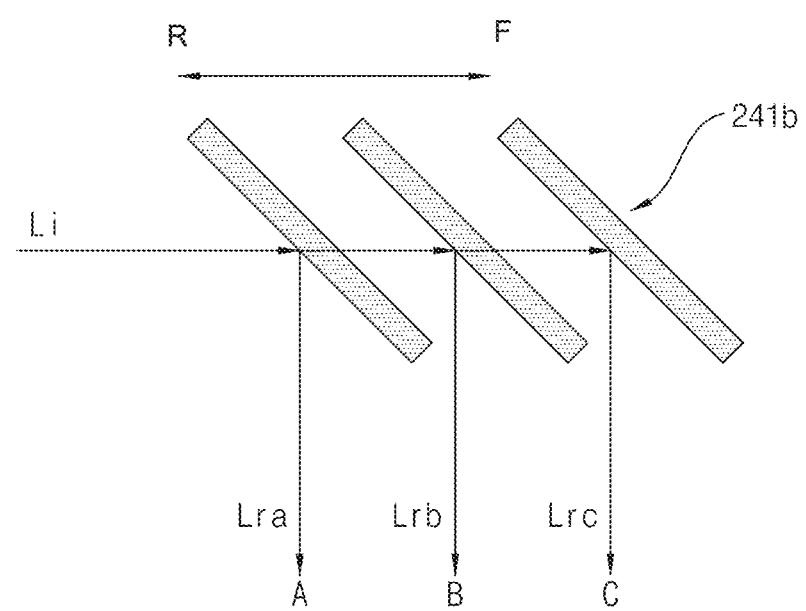

FIGS. 3A and 3B are diagrams showing beam control mirrors according to various exemplary embodiments.

Referring to FIG. 3A, a beam control mirror 241a may include a flat mirror performing swing or semi-rotation. Accordingly, a reflective surface of the beam control mirror 241a may have various angles θa, θb, and θc with respect to incident light Li depending on the swing or semi-rotation. Illustratively, cases in which the angle between the incident light Li and the reflective surface of the beam control mirror 241a is greater than 45° (θa), equal to 45° (θb)), and smaller than 45° (θc) are illustrated. However, exemplary embodiments are not limited thereto, and different angles may be provided. In accordance with various exemplary embodiments, light reflected by the reflective surface of the beam control mirror 241a may advance in various directions in the form of light Lra, Lrb, and Lrc by virtue of the angles θa, θb, and θc formed by the incident light Li and the reflective surface of the beam control mirror 241a. In some embodiments, the beam control mirror 241a may also rotate in left and right directions. In some embodiments, the beam control mirror 241a may rotate in upward and downward directions as well as left and right directions.

Referring to FIG. 3B, a beam control mirror 241b may include a movable flat mirror. The beam control mirror 241b may reflect the incident light Li in the form of light Lra, Lrb and Lrc advancing along various paths A, B and C through forward F and rearward R movement thereof. In some embodiments, the beam control mirror 241b may move upwards and downwards. In an embodiment, the beam control mirror 241b may move in forward and rearward directions as well as upward and downward directions. In some embodiments, the beam control mirror may both perform swing or semi-rotation and move forward and rearward. In other words, in some embodiments, the embodiments of FIGS. 3A and 3B may be combined. Although not explicitly shown, it will be understood that the swing, rotation, and/or movement of the beam control mirror 241a/241b may be controlled by, for example, control logic or a microprocessor coded with suitable code for controlling the swing, rotation, and/or movement.

Figure 4A:
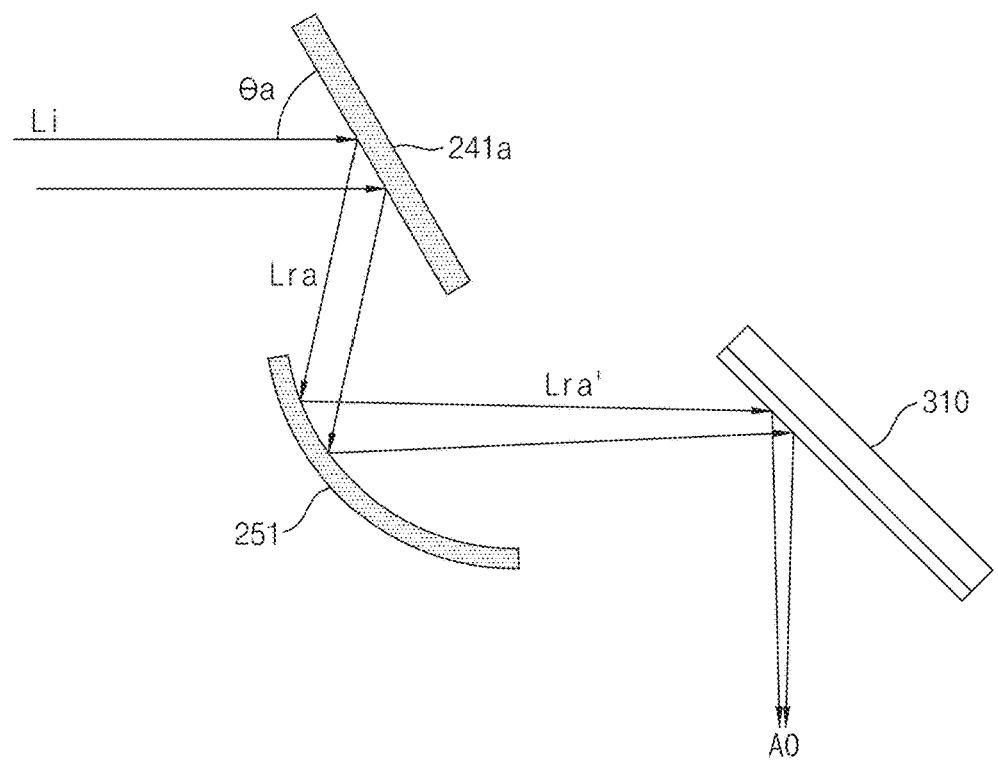
FIGS. 4A to 4C are diagrams describing various advance paths of light reflected by the beam control mirror of FIG. 3A, according to various exemplary embodiments.
Figure 4B:
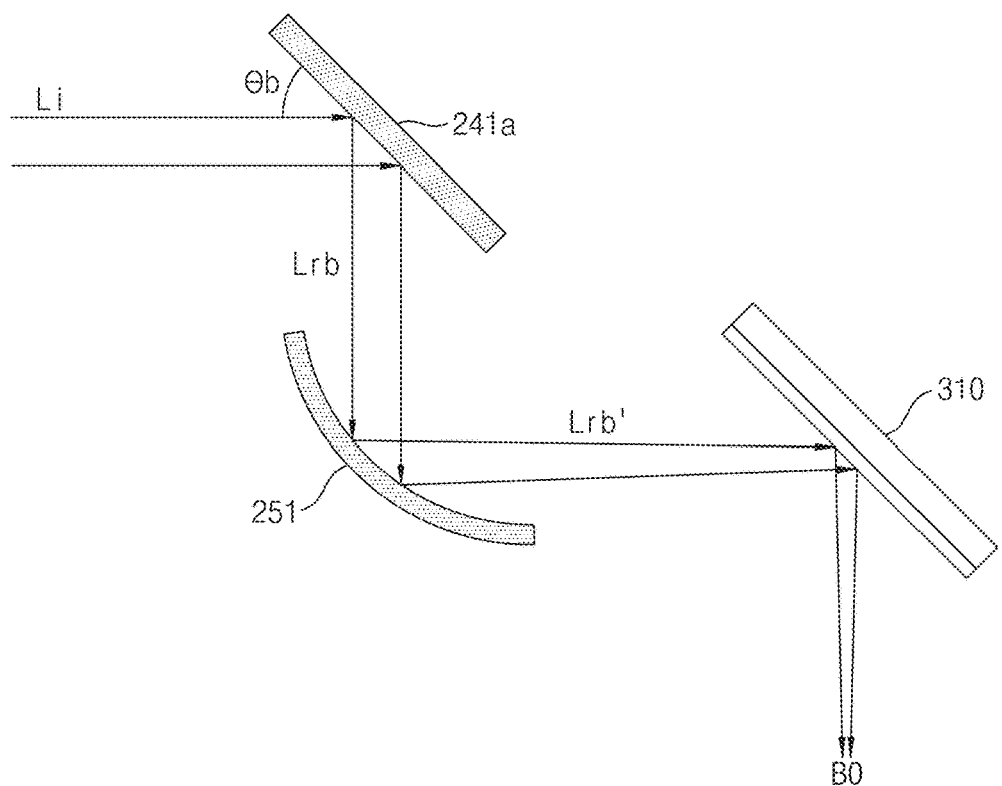
Figure 4C:
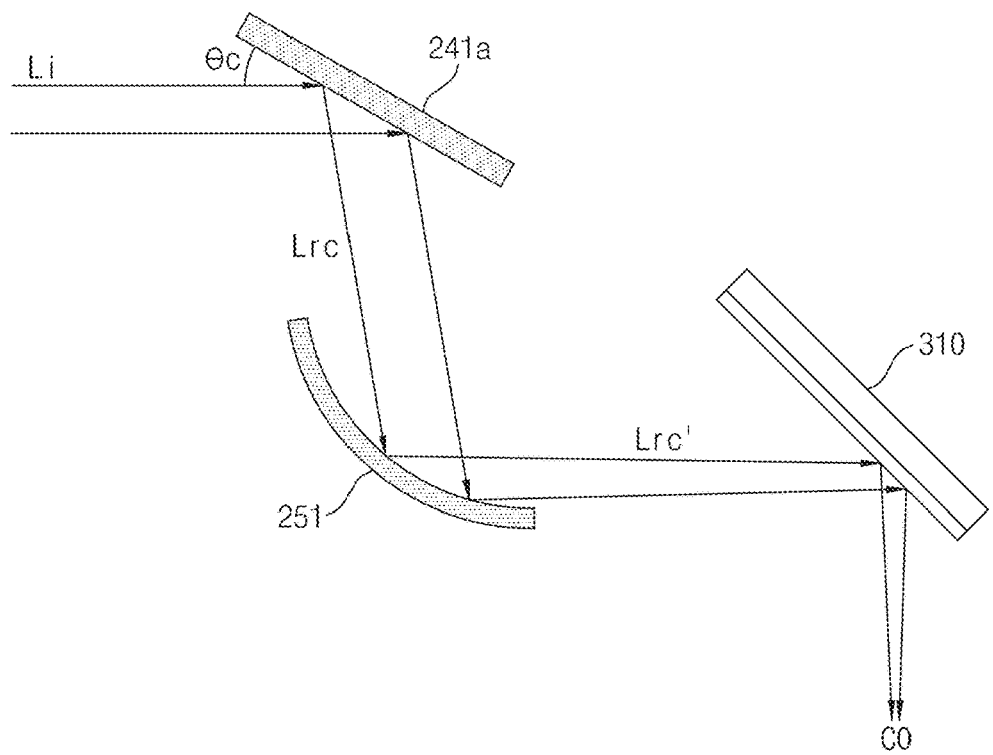

FIGS. 4A to 4C are diagrams describing various advance paths of light reflected by the beam control mirror of FIG. 3A, according to various exemplary embodiments.

Referring to FIG. 4A, when the reflective surface of the beam control mirror 241a and the incident light Li form a first angle θa, for example, an angle greater than 45°, the reflected light Lra may be provided to a first portion of a reflective surface of the relay mirror 251, for example, the first portion of the reflective surface of the relay mirror 251 may be an upper portion. The light Lra provided to the upper portion of the relay mirror 251 may be reflected to a first portion of the first beam splitter 310 and provided to the first portion of the first beam splitter 310. For example, the first portion of the first beam splitter 310 may be an upper surface. Light Lra' provided to the upper surface of the first beam splitter 310 may be directed to a first portion A0 of the reflective objective mirror 320.

Referring to FIG. 4B, when the reflective surface of the beam control mirror 241a and the incident light Li form a second angle θb, for example, an angle of 45°, reflected light Lrb may be irradiated onto a second portion of the reflective surface of the relay mirror 251. For example, the second portion of the reflective surface of the relay mirror 251 may be a central portion. The light Lrb irradiated onto the central portion of the relay mirror 251 may be reflected to a second portion of the first beam splitter 310 and irradiated onto the second portion of the first beam splitter 310. For example, the second portion of the first beam splitter 310 may be a central surface. Light Lrb' irradiated onto the central surface of the first beam splitter 310 may be irradiated onto a second portion B0 of the reflective objective mirror 320.

Referring to FIG. 4C, when the reflective surface of the beam control mirror 241a and the incident light Li form a third angle θc, for example, an angle smaller than 45°, reflected light Lrc may be irradiated onto a third portion of the reflective surface of the relay mirror 251, for example, the third portion of the reflective surface of the relay mirror 251 may be a lower portion. The light Lrc irradiated onto the lower portion of the relay mirror 251 may be reflected to a third portion of the first beam splitter 310 and irradiated onto the third portion of the first beam splitter 310. For example, a third portion of the first beam splitter 310 may be a lower surface. Light Lrc' irradiated onto the lower surface of the first beam splitter 310 may be irradiated onto a third portion C0 of the reflective objective mirror 320.

Referring to FIGS. 4A to 4C, in accordance with operation of the beam control mirror 241a, the incident light Li may be provided to various portions of the relay mirror 251 and the first beam splitter 310, and may be provided to various portions of the reflective objective mirror 320. Since the relay mirror 251 is a concave mirror in the case of FIGS. 3A and 3B, as described above, the relay mirror 251 may convert straight light into focal light. In an embodiment, the relay mirror 251 may also convert focal light into straight light. The combination of the beam control mirror 241 and the relay mirror 251 may convert straight light into focal light. In various exemplary embodiments, it may be possible to adjust the AOI spread of light by adjusting the curvature of the relay mirror 251.

Figure 5:
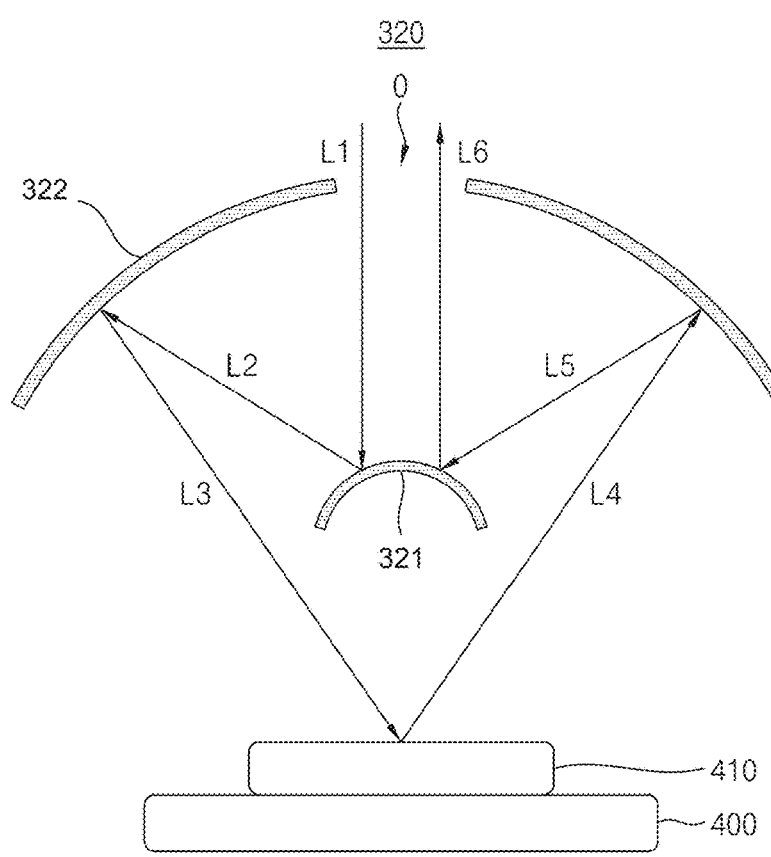
FIG. 5 is a diagram showing paths of light advancing inside a reflective objective mirror of a mirror module of the measurement system of FIG. 1, according to an exemplary embodiment.

FIG. 5 is a diagram showing paths of light advancing inside the reflective objective mirror of the mirror module of the measurement system of FIG. 1, according to an exemplary embodiment. For example, in FIG. 5, arrows are used to show how the light advances along various paths inside the reflective objective mirror.

Referring to FIG. 5, the reflective objective mirror 320 may include the lower mirror, that is, the convex mirror 321 directed upwards, and the upper mirror, that is, the concave mirror 322 directed downwards. The concave mirror 322 may include an opening O. The opening O may be formed at a central portion of the concave mirror 322, which is most concave. Light L1 incident through a left half portion of the opening O in the concave mirror 322 may be irradiated and provided to a left half portion of the convex mirror 321, and may then be reflected from the left half portion of the convex mirror 321. Light L2 reflected from the convex mirror 321 may be irradiated and provided to a left half portion of the concave mirror 322, and may then be reflected from the left half portion of the concave mirror 322. Light L3 irradiated and reflected from the left half portion of the concave mirror 322 may be provided to the test sample 410 on the stage 400, and may then be reflected from the test sample 410. Light L4 reflected from the test sample 410 may be irradiated and provided to a right half portion of the concave mirror 322, and may then be reflected from the right half portion of the concave mirror 322. Light L5 irradiated and reflected from the right half portion of the concave mirror 322 may be provided to a right half portion of the convex mirror 321, and may then be reflected from the right half portion of the convex mirror 321. Light L6 irradiated and reflected from the right half portion of the convex mirror 321 may be outwardly irradiated through a right half portion of the opening O in the concave mirror 322.

Referring to FIG. 1, the light L6 passing through the right half portion of the opening O may be irradiated onto the detector 500. The reflective objective mirror 320 may convert the light Li, which is incident perpendicularly to a surface of the test sample 410 into the light L3, which is inclinedly incident upon the surface of the test sample 410. In addition, the light L4, which is inclinedly reflected from the surface of the test sample 410, may be converted into the light L6, which is outwardly irradiated in a direction perpendicular to the surface of the test sample 410.

In the exemplary embodiments of the disclosure, the light L1, L2 and L3 advancing from an outside, for example, from the first beam splitter 310, to the test sample 410 may use first half portions of the convex mirror 321 and the concave mirror 322, for example, the left half portions thereof, whereas the light L4, L5 and L6 advancing to an outside, for example, to the detector 500, after being reflected from the test sample 410 may use second half portions of the convex mirror 321 and the concave mirror 322, for example, the right half portions thereof. That is, the incident light L1, L2 and L3 and the reflected light L4, L5 and L6 may use corresponding portions of the opening O, the convex mirror 321 and the concave mirror 322 in an exclusive manner. However, this is only an example. Accordingly to other exemplary embodiments, unlike that illustrated in FIG. 5, the incident light L1, L2, and L3 may be incident upon the right half portion of the convex mirror 321. In such a case, when the incident light L1, L2 and L3 is incident upon the right half portion of the convex mirror 321, the incident light L1, L2 and L3 may use the right half portion of the convex mirror 321 and the right half portion of the concave mirror 322, and the reflected light L4, L5 and L6 may use the left half portion of the concave mirror 322 and the left half portion of the convex mirror 321. Accordingly, when the incident light L1, L2 and L3 use an upper half portion of the convex mirror 321 and an upper half portion of the concave mirror 322, the reflected light L4, L5 and L6 may use a lower half portion of the concave mirror 322 and a lower half portion of the convex mirror 321. When the incident light L1, L2 and L3 use the lower half portion of the convex mirror 321 and the lower half portion of the concave mirror 322, the reflected light L4, L5 and L6 may use the upper half portion of the concave mirror 322 and the upper half portion of the convex mirror 321. In an embodiment, the reflective objective mirror 320 may horizontally rotate. For example, the convex mirror 321 and the concave mirror 322 may independently move and rotate. Although not explicitly shown, it will be understood that the convex mirror 321 and the concave mirror 322 may be rotated and/or moved under control of, for example, control logic or a microprocessor coded with suitable code for controlling the rotation and/or movement. In some embodiments, each of the convex mirror 321, the concave mirror 322 and the opening O may have a polygonal shape.

Figure 6A:
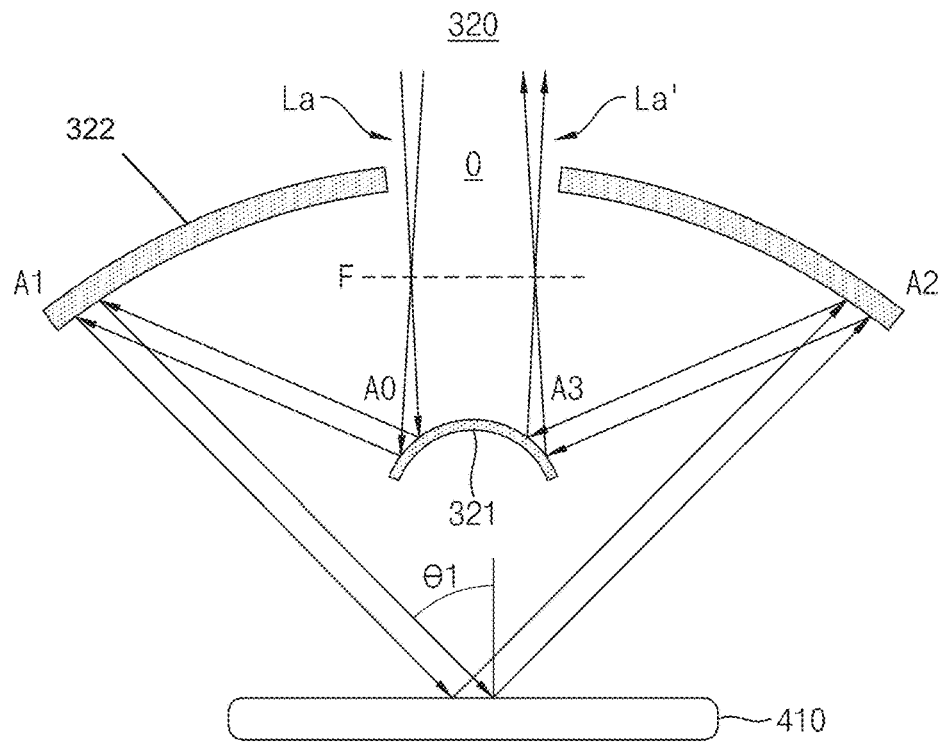
FIGS. 6A to 6C are diagrams showing various adjustments of AOIs of light incident upon a test sample in the reflective objective mirror of FIG. 5, according to various exemplary embodiments.
Figure 6B:
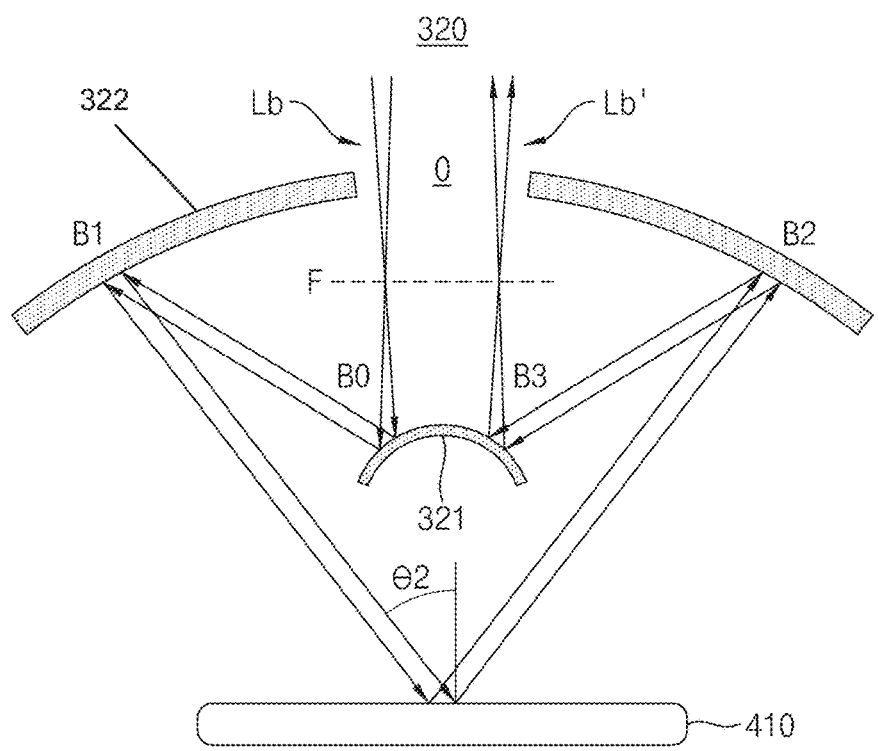
Figure 6C:
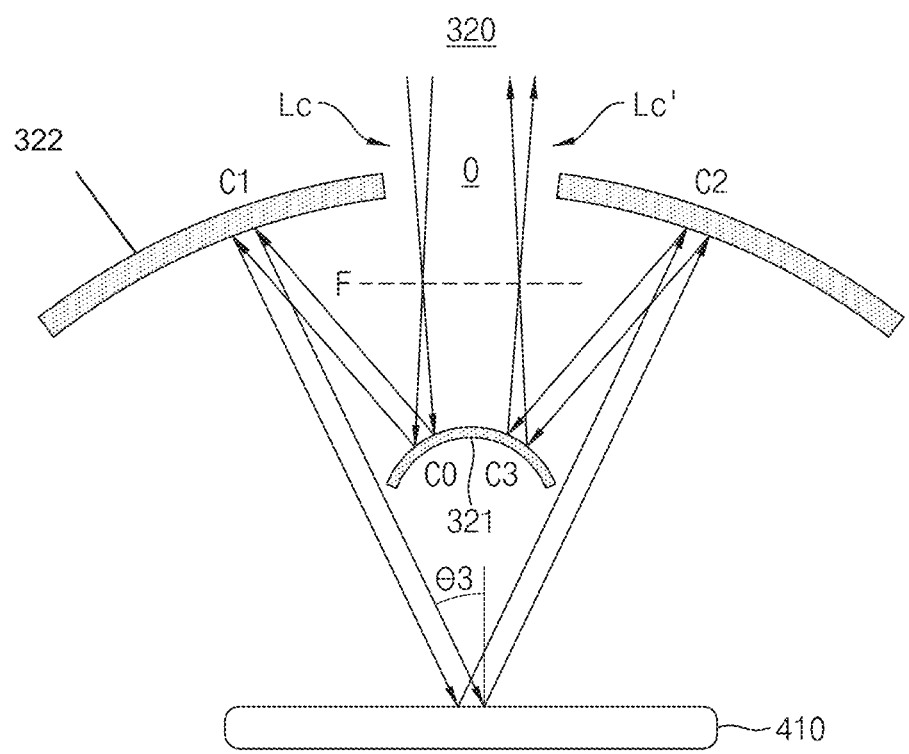

FIGS. 6A to 6C are diagrams showing various adjustments of AOIs of light incident upon a test sample in the reflective objective mirror of the mirror module of FIG. 1, according to various exemplary embodiments.

Referring to FIGS. 4A and 6A, first light La incident upon a first part A0 of the left half portion of the convex mirror 321 after passing through the opening O in the concave mirror 322, may be outwardly irradiated toward a first part A1 of the left half portion of the concave mirror 322, then reflected toward the surface of the test sample 410, then reflected toward a first part A2 of the right half portion of the concave mirror 322, and then reflected toward a first part A3 of the right half portion of the convex mirror 321, and finally reflected back toward the opening O as light La'. The first light La may be incident upon the surface of the test sample 421 through a first angle θ1.

Referring to FIGS. 4B and 6B, second light Lb incident upon a second part B0 of the left half portion of the convex mirror 321 after passing through the opening O in the concave mirror 322 may be outwardly irradiated toward a second part B1 of the left half portion of the concave mirror 322, then reflected toward the surface of the test sample 410, then reflected toward a second part B2 of the right half portion of the concave mirror 322, and then reflected toward a second part B3 of the right half portion of the convex mirror 321, and finally reflected back toward the opening O as light Lb'. The second light Lb may be incident upon the surface of the test sample 421 through a second angle θ2.

Referring to FIGS. 4C and 6C, third light Lc incident upon a third part C0 of the left half portion of the convex mirror 321 after passing through the opening O in the concave mirror 322 may be outwardly irradiated toward a third part C1 of the left half portion of the concave mirror 322, then reflected toward the surface of the test sample 410, then reflected toward a third part C2 of the right half portion of the concave mirror 322, and then reflected toward a third part C3 of the right half portion of the convex mirror 321, and finally reflected back toward the opening O as light Lc'. The third light Lc may be incident upon the surface of the test sample 421 through a third angle θ3.

For example, the light La, which is incident upon the convex mirror 321 near an edge of the convex mirror 321, may be relatively widely reflected such that the light La may be reflected onto the concave mirror 322 near an edge of the left half portion of the concave mirror 322 and, as such, may be incident upon the surface of the test sample 410 at the first angle θ1 which is relatively large. On the other hand, the light Lc, which is incident upon the convex mirror 321 closer to a center of the convex mirror 321, may be relatively narrowly reflected such that the light Lc may be reflected onto the concave mirror 322 near a center of the left half portion concave mirror 322 and, as such, may be incident upon the surface of the test sample 410 at the angle θ3 which is relatively small. Thus, the angles θ1, θ2 and θ3, at which the light La, Lb and Lc are incident upon the surface of the test sample 410, may be varied in accordance with the angles θa, θb and θc formed between the reflective surface of the beam control mirror 241 and the incident light Li, respectively as illustrated in FIGS. 4A-4C. The AOIs θ1, θ2 and θ3 are angles formed with respect to a line perpendicular (i.e., orthogonal) to the surface of the test sample 410.

Measurement sensitivity (spectral sensitivity) may be varied in accordance with the AOIs θ1, θ2 and θ3. For example, when light is incident upon the surface of the test sample 410 at the AOI θ1 which is relatively large (for example, when light is incident nearer to the horizon), a measurement value and a measurement image may be relatively greatly varied even for a small variation. That is, when the AOI of light is relatively large, sensitivity may become relatively higher. In addition, when light is incident upon the surface of the test sample 410 at the AOI θ1 which is relatively large, an image according to an oblique viewpoint may be acquired and, as such, the resolution thereof may be degraded. On the contrary, when light is incident upon the surface of the test sample 410 at the AOI θ3 which is relatively small (for example, when light is incident nearer to perpendicular), sensitivity may be relatively low. In addition, when light is incident upon the surface of the test sample 410 at the AOI θ3 which is relatively small, an image according to a viewpoint near the perpendicularity may be acquired and, as such, the resolution thereof may be enhanced. That is, there is a trade-off between sensitivity and resolution. In accordance with the exemplary embodiments of the disclosure, the AOIs θ1, θ2 and θ3 may be adjusted and selected and, as such, sensitivity and resolution may be complementarily set to appropriate levels. For example, when measurement sensitivity is relatively important, the path of light may be adjusted such that the light is incident upon the surface of the test sample 410 at the AOI θ1 which is relatively larger. On the other hand, when resolution is relatively important, the path of light may be adjusted such that the light is incident upon the surface of the test sample 410 at the AOI θ3 which is relatively small.

Again referring to FIGS. 4A to 6C, the light La provided to the reflective objective mirror 320 may be focal light. Accordingly, the light La may have a focal plane F, as illustrated in FIG. 6A. For example, the light La is converging light over the focal plane F (i.e., between the focal plane F and the opening O), while being diverging light under the focal plane F (i.e., between the focal plane F and the convex mirror 321). In an embodiment, the light La may be straight light. In various exemplary embodiments of the disclosure, it may be possible to adjust the AOI spread of light by adjusting curvatures of reflective surfaces of the convex mirror 321 and the concave mirror 322.

Figure 7C:
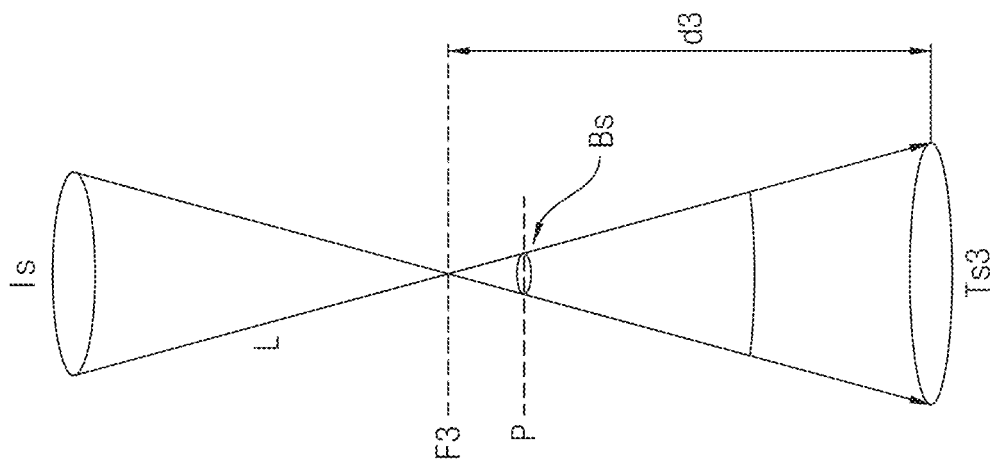
FIGS. 7A to 7C are diagrams showing that a spot size of light is varied in accordance with positions of focal planes of the light in the measurement system of FIG. 1, according to the exemplary embodiment.
Figure 7B:
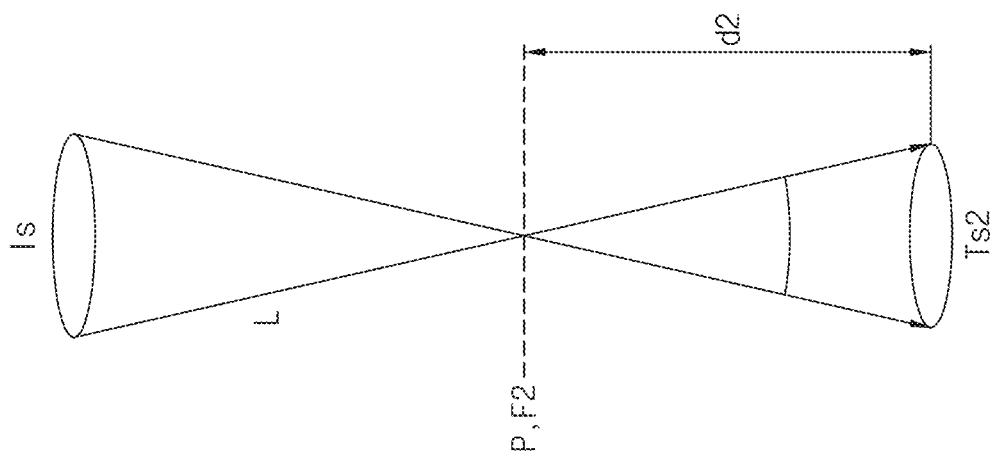
Figure 7A:
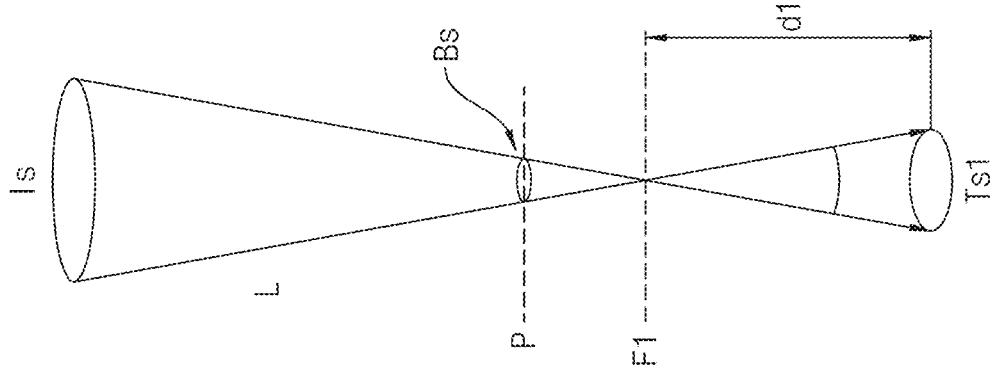

FIGS. 7A to 7C are diagrams showing that a spot size of light is varied in accordance with positions of focal planes of the light in the measurement system of FIG. 1, according to various exemplary embodiments.

FIG. 7A shows that a focal plane F1 is formed at a higher level than a pupil plane P. FIG. 7B shows that the focal plane F1 is formed at a same level as the pupil plane P. FIG. 7C shows that the focal plane F1 is formed at a lower level than the pupil plane P. For example, it is assumed that an initial spot size Is of light L is a spot size of light provided from the first beam splitter 310, and target spot sizes Ts1 to Ts3 are spot sizes of light provided to the convex mirror 321, respectively. Referring to FIGS. 7A to 7C, the focal planes F1, F2 and F3 may be disposed between the initial spot size Is and respective spot sizes Ts' to Ts3. A spot size Bs of light L may be varied in accordance with distances d1, d2 and d3 from respective focal planes F1, F2 and F3 to a target surface T. The distances d1, d2 and d3 may be adjusted through upward and downward movement of the reflective objective mirror 320 and the stage 400. Although not explicitly shown, it will be understood that the reflective objective mirror 320 and the stage 400 may be adjusted under control of, for example, control logic or a microprocessor coded with suitable code for controlling the adjustment.

Figure 8A:
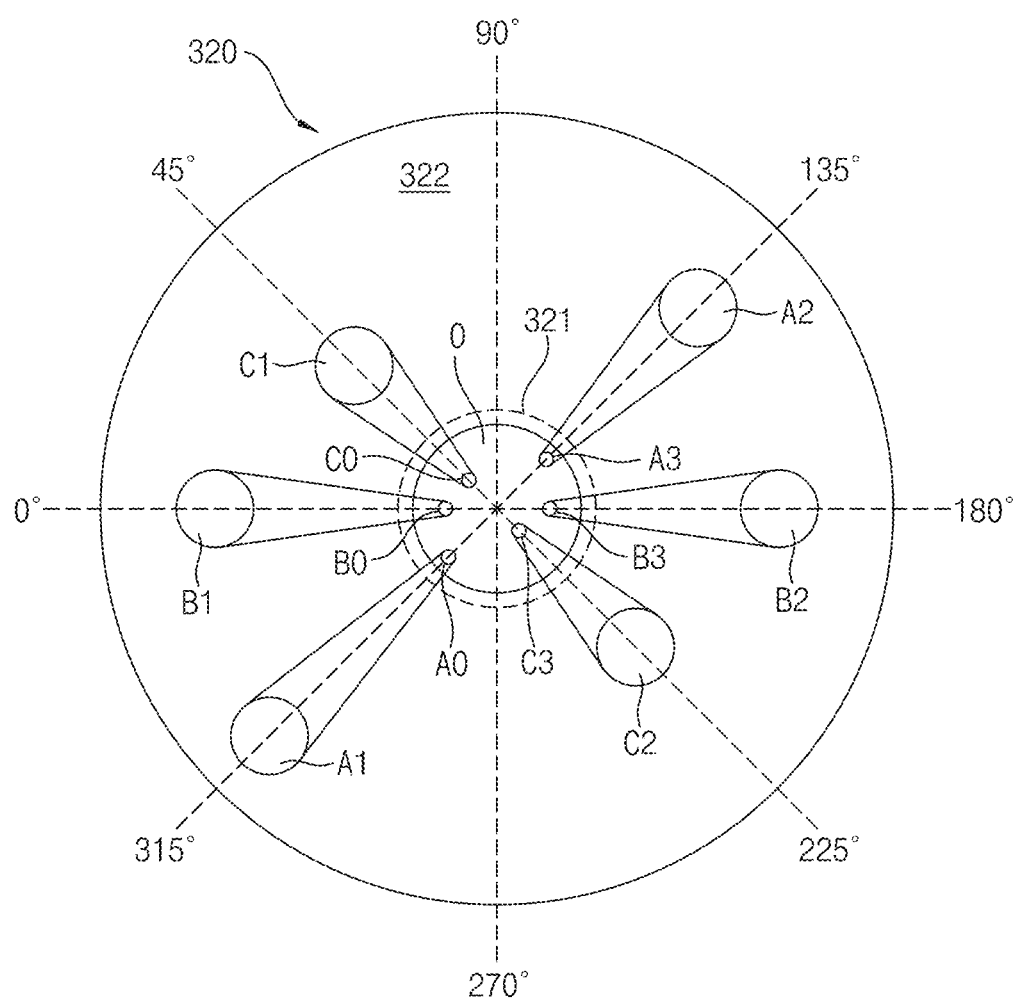
FIGS. 8A and 8B are top views showing a variation in an azimuth of light inside a reflective objective mirror of the measurement system of FIG. 1, according to an exemplary embodiment.
Figure 8B:
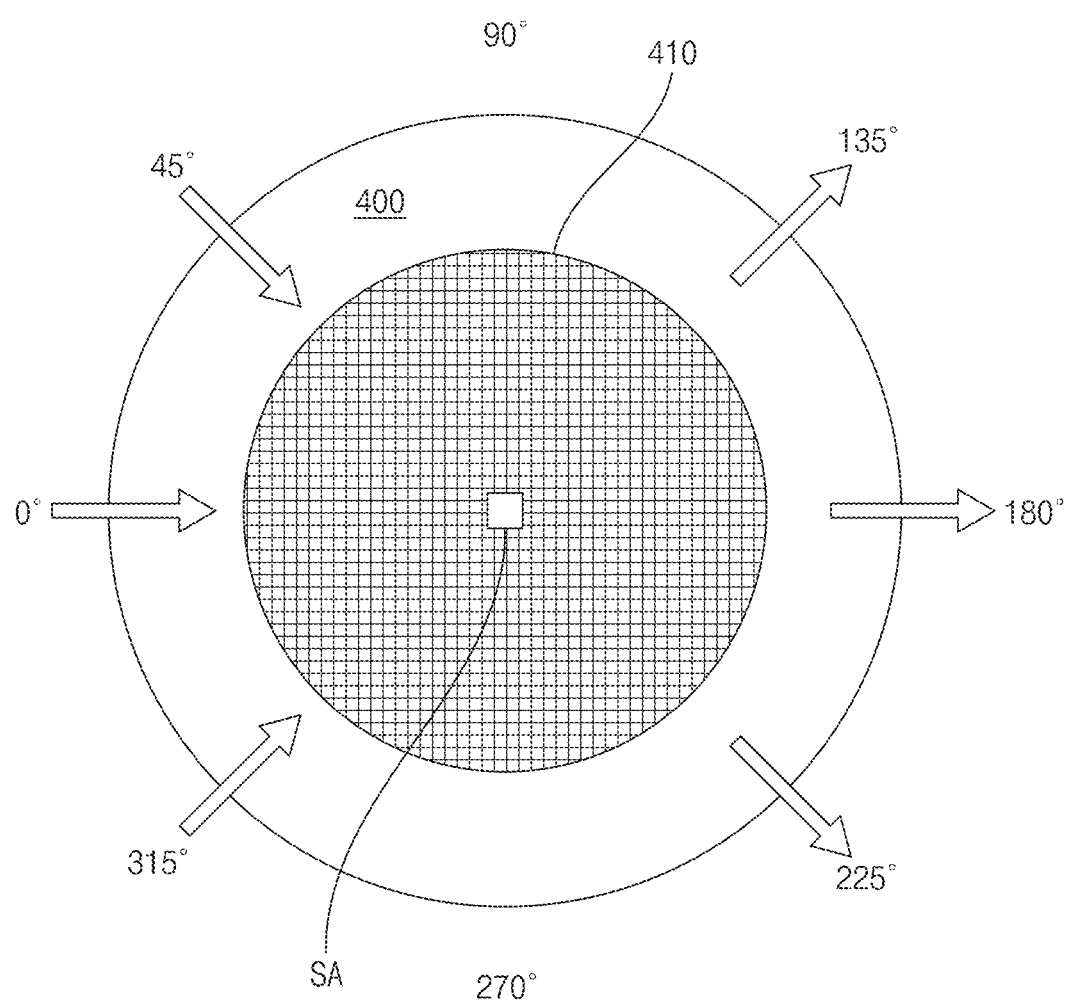

FIGS. 8A and 8B are top views showing a variation in an azimuth of light inside the reflective objective mirror of the measurement system of FIG. 1, according to an exemplary embodiment.

Referring to FIGS. 8A and 8B, when viewed in a top view, the convex mirror 321 may have a circular shape, and the convex mirror 322 may have a disc shape having an opening O. Again referring to FIGS. 6A to 6C, the light La, Lb and Lc may be incident upon respective parts A0, B0 and C0 of the left half portion of the convex mirror 321 after passing through the opening O, may then be reflected onto respective parts A1, B1 and C1 of the left half portion of the concave mirror 322, and may be subsequently incident upon the surface of the test sample 410. For example, corresponding ones of the parts A0 to A3, B0 to B3 and C0 to C3 of the mirrors 321 and 322 are arranged in point symmetry. The light La incident upon a first position A0 near an outer circumferential surface of the convex mirror 321 may be incident upon a scan area SA of the test sample 410 at a relatively large angle (θ1: for example, a relatively inclined angle). The light Lc incident upon a third position C0 near a center of the convex mirror 321 may be incident upon the scan area SA of the test sample 410 at a relatively small angle (θ3: for example, a relatively normal angle). Respective parts A0, B0, C0, A3, B3 and C3 of the convex mirror 321 and respective parts A1, B1, C2, A2, B2 and C2 of the concave lens 322 are shown as being aligned at various azimuths of 0°, 45°, 135°, 180°, 225°, and 315°. However, exemplary embodiments are not limited thereto. In some exemplary embodiments, the light La, Lb and Lc incident upon respective parts A0, B0 and C0 of the left half portion of the convex mirror 321 may be reflected at various azimuths φ in accordance with respective positions of the parts. Accordingly, reflected light may be incident upon the surface of the test sample 410 at various azimuths φ.

Arrows in FIG. 8B indicate advance directions of light. For example, light incident upon the surface of the test sample 410 at an azimuth of 0° may be reflected from the surface of the test sample 410 at an azimuth of 180°. Light incident upon the surface of the test sample 410 at an azimuth of 45° may be reflected from the surface of the test sample 410 at an azimuth of 225°. Light incident upon the surface of the test sample 410 at an azimuth of 315° may be reflected from the surface of the test sample 410 at an azimuth of 135°. The first half portion of the convex mirror 321 and the first half portion of the concave mirror 322 may be exclusively used for a path along which light from the outside is incident upon the stage 400, and the second half portion of the convex mirror 321 and the second half portion of the concave mirror 322 may be exclusively used for a path along which light is reflected from the stage 400 to the outside. As described above, advance paths of light may be controlled through various methods. For example, paths of light and positions A0, B0 and C0, to which light is provided, may be variously set as the reflective objective mirror 320 moves in forward and rearward directions and in left and right directions. In an embodiment, various light paths may be provided from the illumination module 200A.

Consequently, various control methods may be carried out in order to enable light to be incident upon the right half portion, the left half portion or the lower half portion of the convex mirror 321. Accordingly, an azimuth φ of light may cover all azimuths. Thus, in accordance with exemplary embodiments of the disclosure, light may be incident upon the test sample 410 at various azimuths φ. The contrast of an acquired image may be varied in accordance with an azimuth φ of light.

Figure 9A:
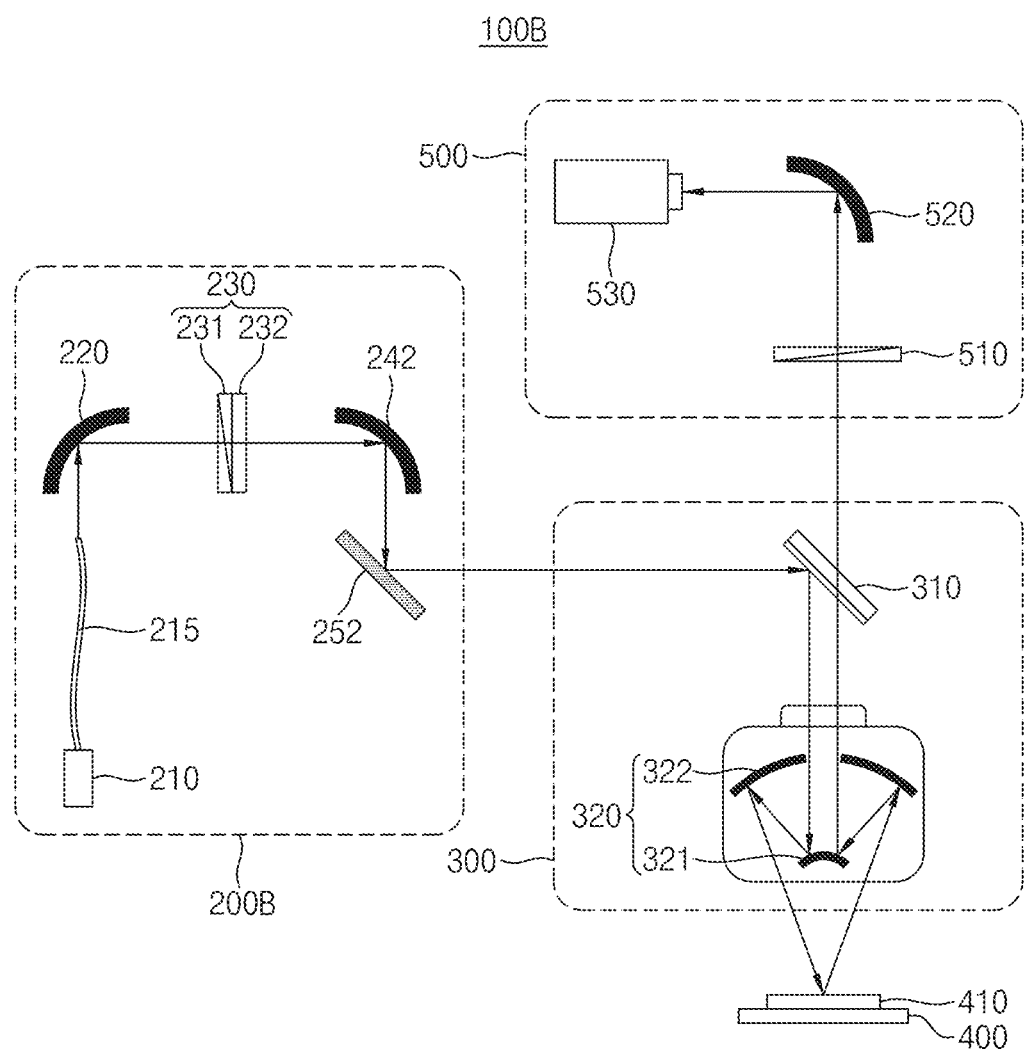
FIG. 9A is a diagram schematically showing a measurement system according to an exemplary embodiment.

FIG. 9A is a diagram schematically showing a measurement system according to an exemplary embodiment.

Referring to FIG. 9A, a measurement system 100B may include an illumination module 200B, a mirror module 300, a stage 400, and a detector 500. The illumination module 200B may include a light source 210, an optical fiber 215, a collimating mirror 220, a polarization state generator 230, a beam control mirror 242, and a relay mirror 252. Elements with the same reference designators as in FIG. 1 as are the same as described above, and thus a repeated description thereof will be omitted for conciseness. The beam control mirror 242 may include a convex mirror. The relay mirror 252 may include a flat mirror.

Figure 9B:
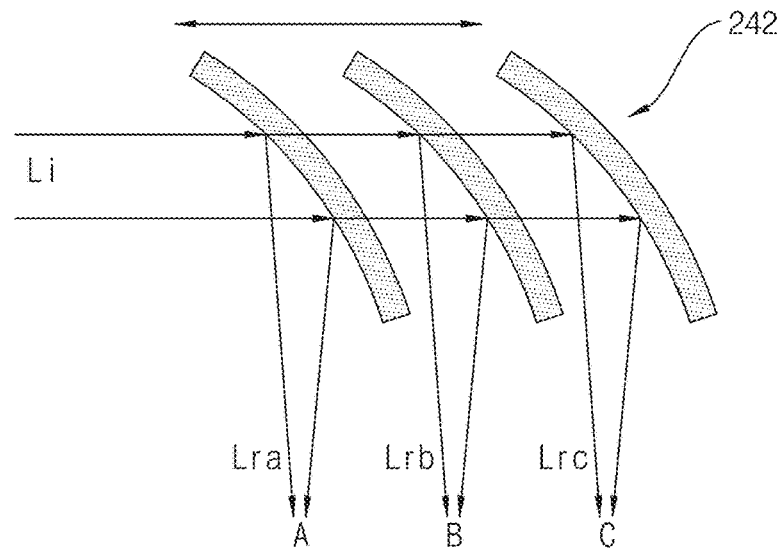
FIG. 9B is a diagram concretely showing operation of a beam control mirror of the measurement system of FIG. 9A, according to an exemplary embodiment.

FIG. 9B is a diagram showing operation of the beam control mirror 242 of FIG. 9A, according to an exemplary embodiment.

Referring to FIG. 9B, the beam control mirror 242 may include a movable concave mirror. Through forward and rearward movement thereof, the beam control mirror 242 may reflect incident light Li in the form of light Lra, Lrb and Lrc advancing in various paths. In addition, the beam control mirror 242 may convert collimated incident light Li into focal light Lra, Lrb and Lrc having focal points. In some embodiments, the beam control mirror 242 may swing like the beam control mirror 241. Although not explicitly shown, it will be understood that the beam control mirror 242 may be moved and/or swung under control of, for example, control logic or a microprocessor coded with suitable code for controlling the movement and/or swing.

Figure 9C:
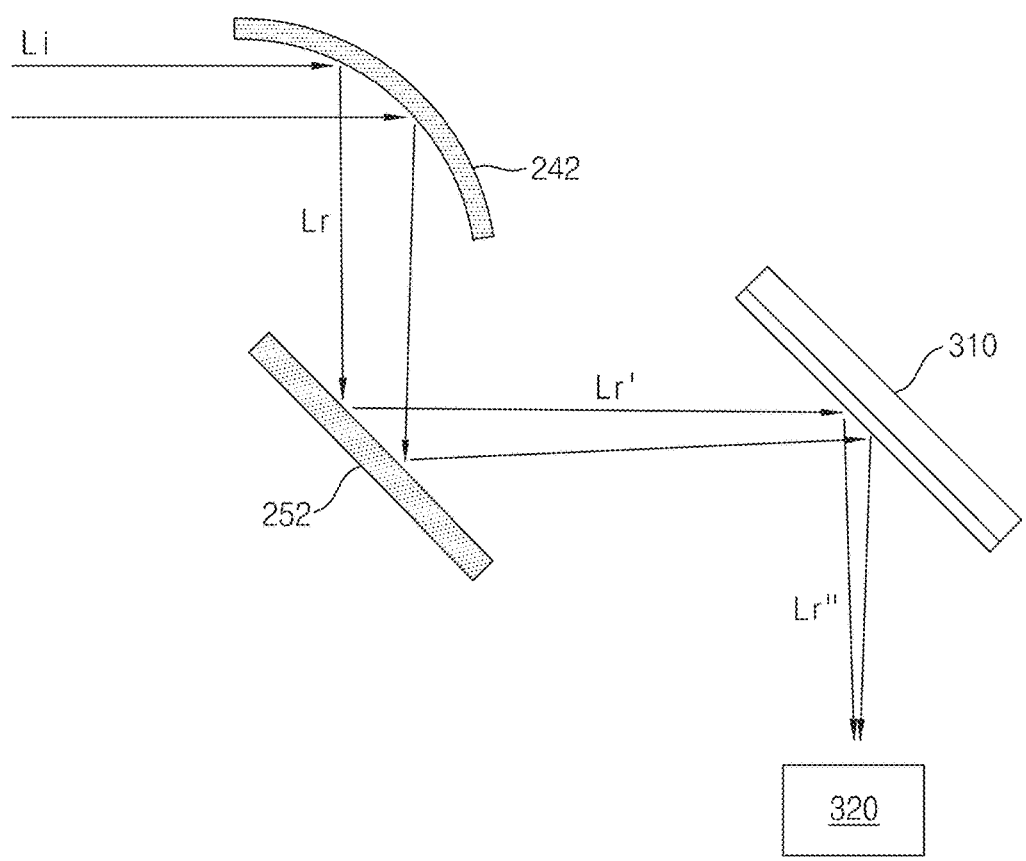
FIG. 9C is a diagram showing a path along which light is advanced by the beam control mirror and a relay mirror of the measurement system of FIG. 9A, according to an exemplary embodiment.

FIG. 9C is a diagram showing an advance path along which light is advanced by the beam control mirror and the relay mirror according to an exemplary embodiment.

Referring to FIG. 9C, incident light Li may be converted into focal light by the beam control mirror 242 which is concave, and may be provided to the first beam splitter 310 through reflection by the relay mirror 252. The light may then be provided to the reflective objective mirror 320 by the first beam splitter 310. Since the incident light Li may be converted into focal light by the concave beam control mirror 242, the relay mirror 252 may be a flat mirror. In some embodiments, although the incident light Li may be converted into focal light by the beam control mirror 242 that is concave, the relay mirror 252 may include a concave mirror. In various exemplary embodiments of the disclosure, it may be possible to adjust an AOI spread of light by adjusting the curvature of a reflective surface of the beam control mirror 242.

Figure 10A:
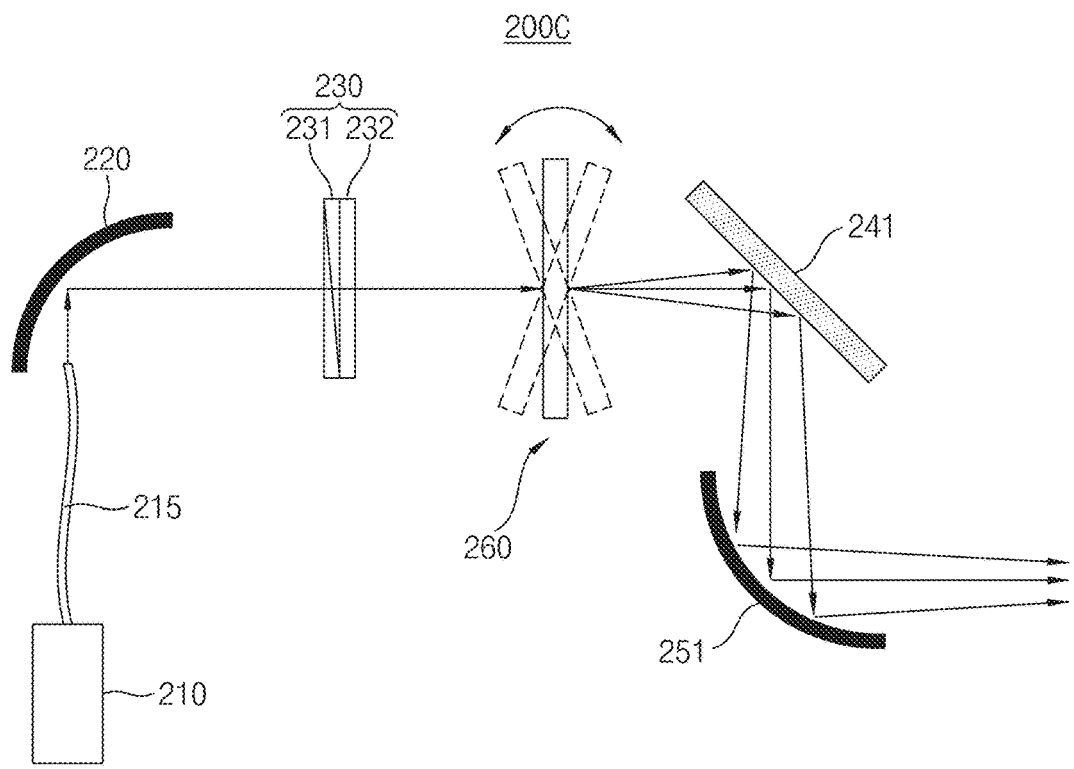
FIGS. 10A to 10C are diagrams schematically showing illumination modules, according to exemplary embodiments.
Figure 10B:
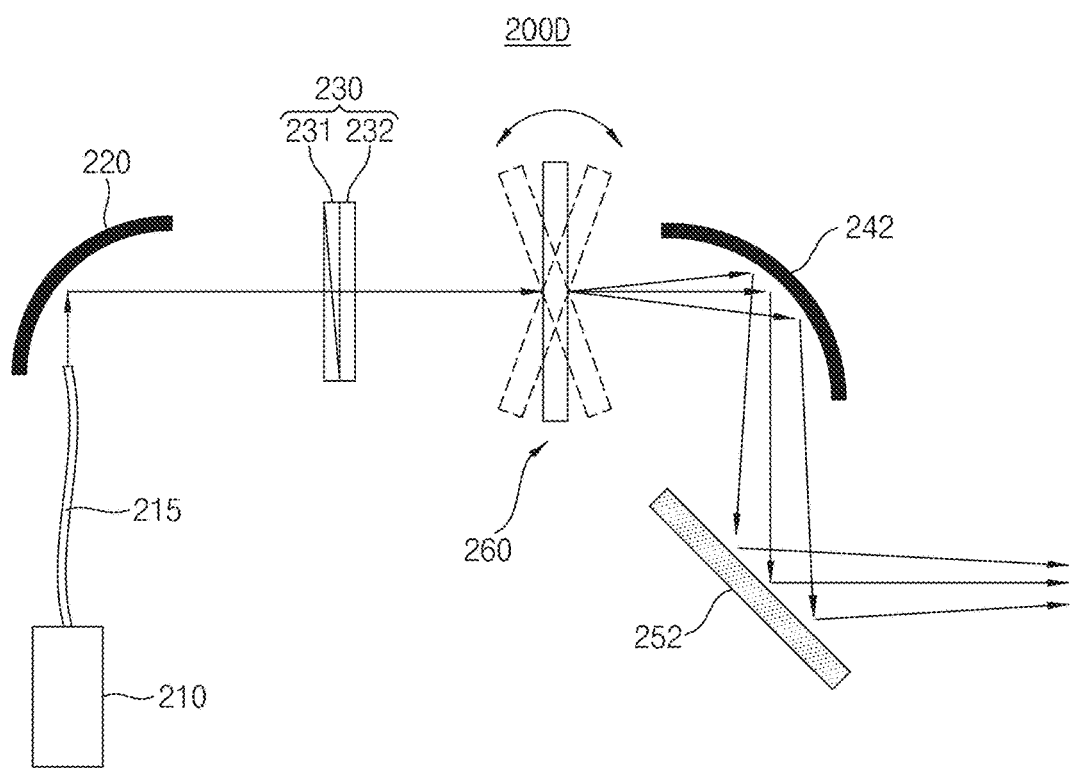
Figure 10C:
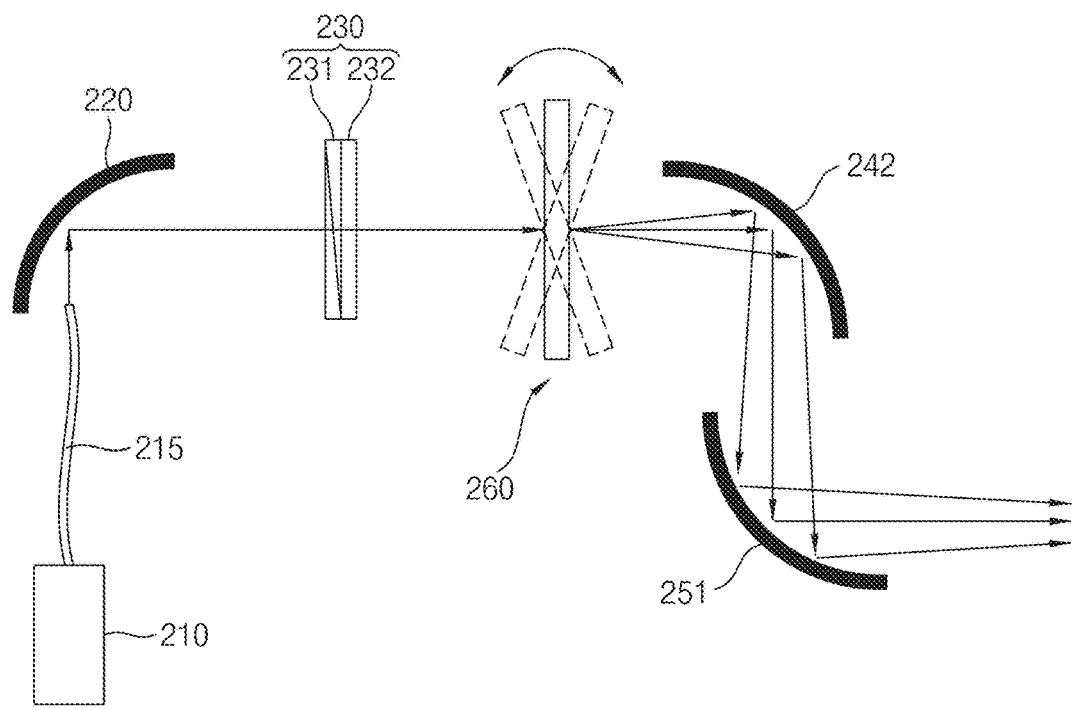

FIGS. 10A to 10C are diagrams schematically showing illumination modules, according to various exemplary embodiments.

Referring to FIG. 10A, a illumination module 200C may include a light source 210, an optical fiber 215, a collimating mirror 220, a polarization state generator 230, a beam control mirror 241, a relay mirror 251, and a transparent swing panel 260. Elements with the same reference designators as in FIGS. 1-9C as are the same as described above, and thus a repeated description thereof will be omitted for conciseness. The swing panel 260 may be disposed between the polarization state generator 230 and the beam control mirror 241. In accordance with swing operation of the swing panel 260, light may be inclinedly incident upon various positions of the beam control mirror 241. Light inclinedly incident upon the beam control mirror 241 may be reflected onto various positions of the relay mirror 251. Light reflected from the relay mirror 251 may be provided to various positions of the reflective objective mirror 320 via the first beam splitter 310. The swing panel 260 may include a transparent flat plate. The beam control mirror 241 may include a flat mirror, and the relay mirror 251 may include a concave mirror.

Referring to FIG. 10B, an illumination module 200D may include a light source 210, an optical fiber 215, a collimating mirror 220, a polarization state generator 230, a beam control mirror 242, a relay mirror 252, and a swing panel 260. Elements with the same reference designators as in FIGS. 1-9C as are the same as described above, and thus a repeated description thereof will be omitted for conciseness. The beam control mirror 242 may include a concave mirror, and the relay mirror 251 may include a flat mirror. Referring to FIG. 10C, an illumination module 200E may include a light source 210, an optical fiber 215, a collimating mirror 220, a polarization state generator 230, a beam control mirror 242, a relay mirror 251, and a swing panel 260. Elements with the same reference designators as in FIGS. 1-9C as are the same as described above, and thus a repeated description thereof will be omitted for conciseness. The beam control mirror 242 may include a concave mirror, and the relay mirror 252 may include a flat mirror.

In the illumination modules 200A to 200E according to the various exemplary embodiments, at least one of the beam control mirrors 241 and 242 and the relay mirrors 251 and 252 may be a concave mirror. In detail, the illumination modules 200A to 200E may include one of the combination of the beam control mirror 241 of the flat mirror type and the relay mirror 251 of the concave mirror type, the combination of the beam control mirror 242 of the concave mirror type and the relay mirror 252 of the flat mirror type, and the combination of the beam control mirror 242 of the concave mirror type and the relay mirror 252 of the flat mirror type. The illumination modules 200C, 200D and 200E of FIGS. 10A to 10C may be selectively applied to the measurement systems 100A and 100B according to the exemplary embodiments.

Figure 11:
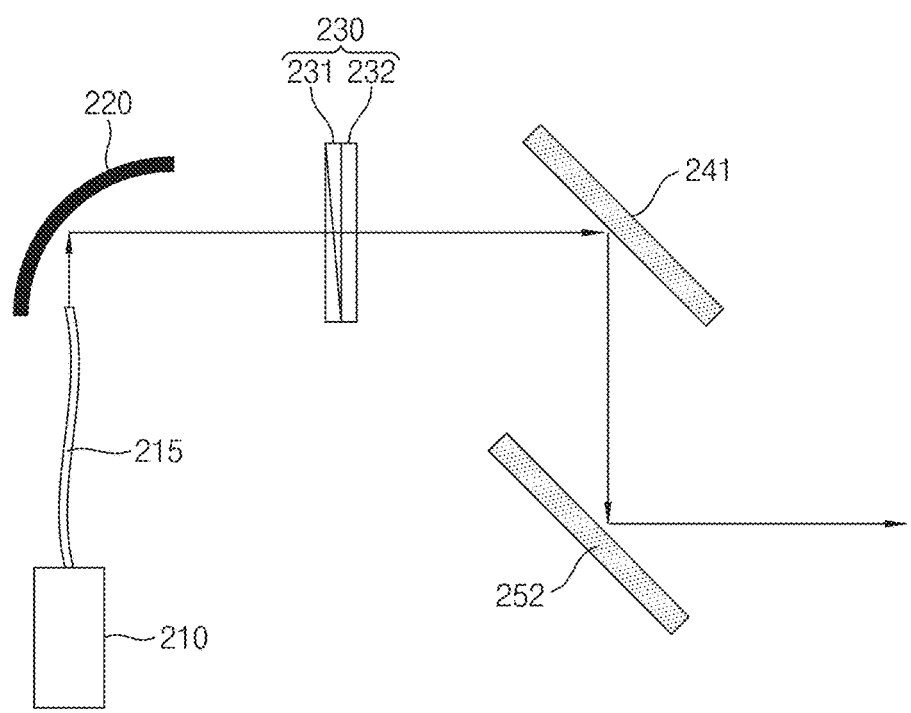
FIG. 11 is a diagram schematically showing an illumination module according to an exemplary embodiment.

FIG. 11 is a diagram schematically showing an illumination module according to an exemplary embodiment.

Referring to FIG. 11, an illumination module 200F may include a light source 210, an optical fiber 215, a collimating mirror 220, a polarization state generator 230, a beam control mirror 241, and a relay mirror 252. Elements with the same reference designators as in FIGS. 1-10C as are the same as described above, and thus a repeated description thereof will be omitted for conciseness. The beam control mirror 241 and the relay mirror 252 may include flat mirrors, respectively.

Figure 12A:
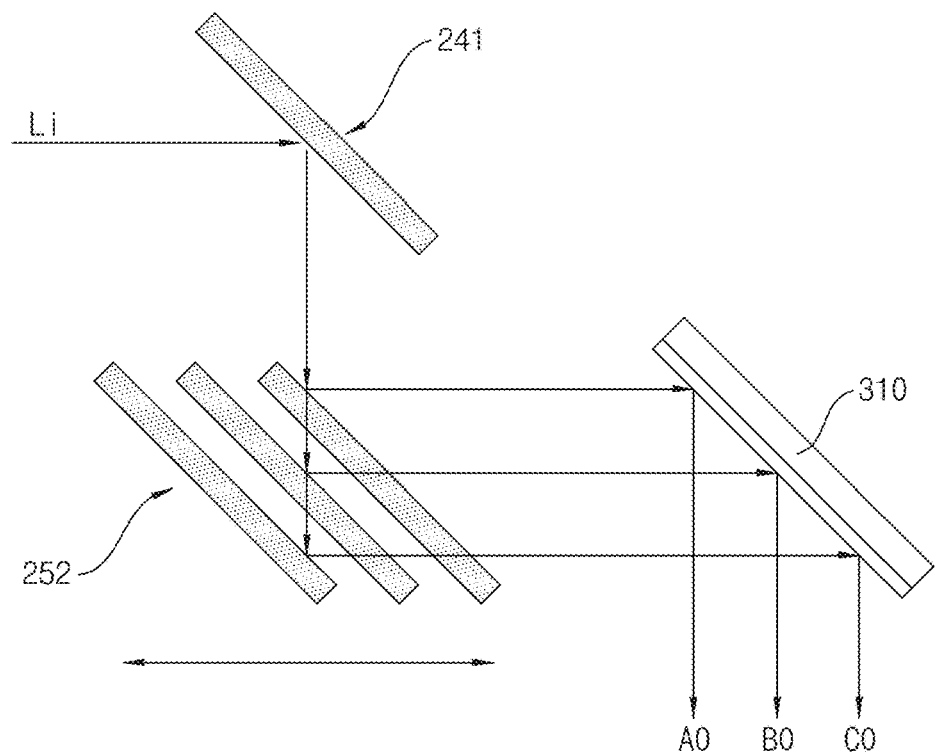
FIGS. 12A and 12B are diagrams showing various advance paths of light reflected by a relay mirror in the illumination module of FIG. 11, according to an exemplary embodiment.
Figure 12B:
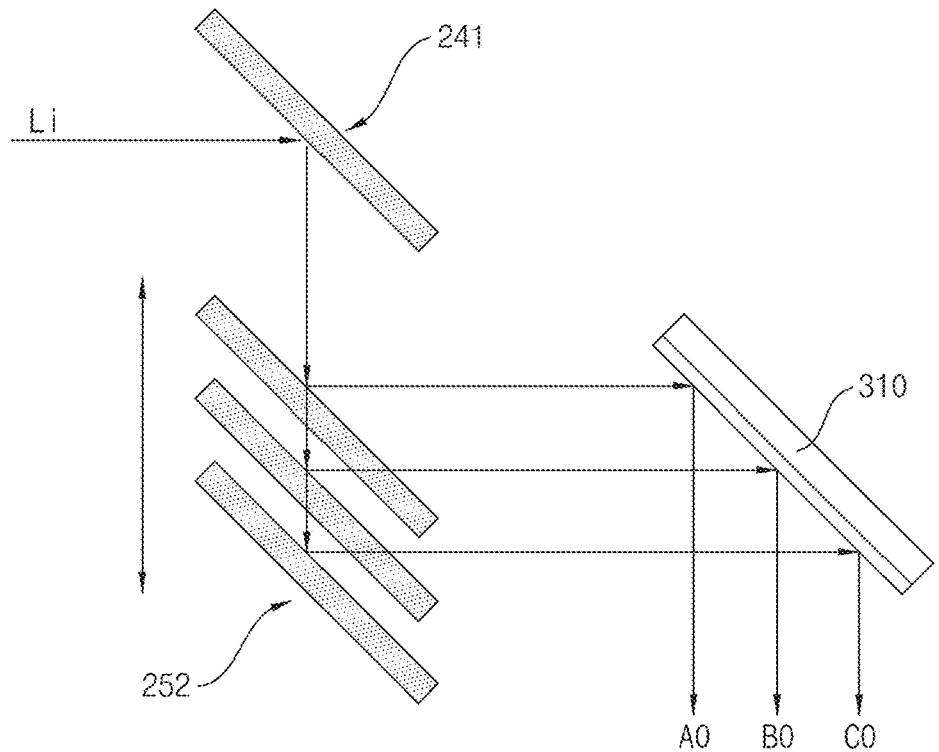

FIGS. 12A and 12B are diagrams showing various advance paths of light reflected by a relay mirror in an illumination module according to an exemplary embodiment.

Referring to FIG. 12A, the relay mirror 252 may move horizontally. Accordingly, the light Lra reflected from an upper surface portion of the relay mirror 252 may be provided to an upper portion of the first beam splitter 310, and may then be directed to the first portion A0 of the reflective objective mirror 320. The light Lrb reflected from a central surface portion of the relay mirror 252 may be provided to a central portion of the first beam splitter 310, and may then be directed to the second portion B0 of the reflective objective mirror 320. The light Lrc reflected from a lower surface portion of the relay mirror 252 may be provided to a lower portion of the first beam splitter 310, and may then be directed to the third portion C0 of the reflective objective mirror 320.

Referring to FIG. 12B, the relay mirror 252 may move vertically. Accordingly, the light Lra reflected from the relay mirror 252, which is disposed at a higher level, may be provided to the upper portion of the first beam splitter 310, and may then be directed to the first portion A0 of the reflective objective mirror 320. The light Lrb reflected from the relay mirror 252, which is disposed at a middle level, may be provided to the central portion of the first beam splitter 310, and may then be directed to the second portion B0 of the reflective objective mirror 320. The light Lrc reflected from the relay mirror 252, which is disposed at a lower level, may be provided to the lower portion of the first beam splitter 310, and may then be directed to the third portion C0 of the reflective objective mirror 320.

Figure 13:
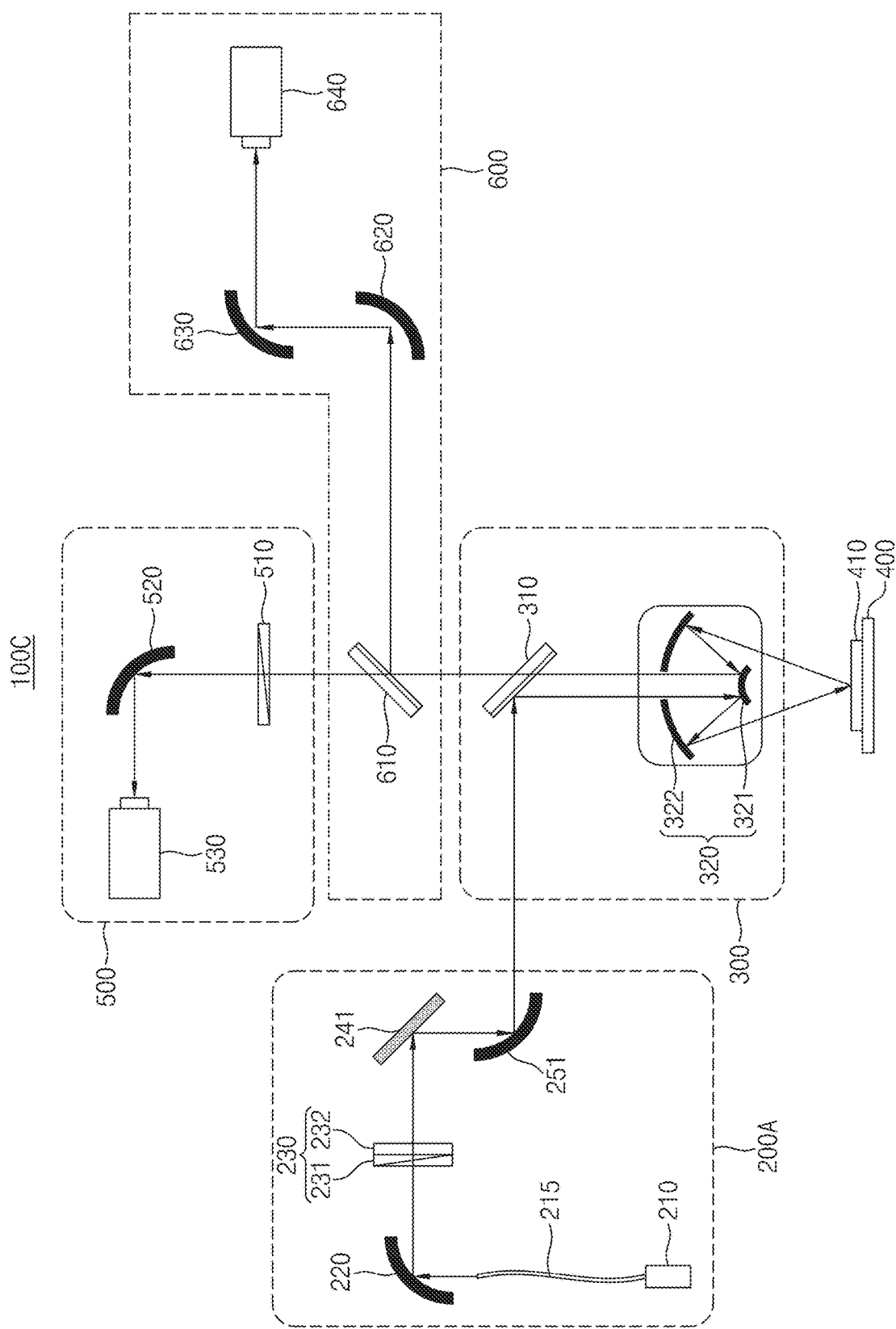
FIG. 13 is a diagram schematically showing the measurement system of FIG. 11, according to an exemplary embodiment.

FIG. 13 is a diagram schematically showing a measurement system according to an exemplary embodiment.

Referring to FIG. 13, a measurement system 100C may include an illumination module 200B, a mirror module 300, a stage 400, a detector 500, and a pupil analyzer 600. Elements with the same reference designators as in FIGS. 1-12B as are the same as described above, and thus a repeated description thereof will be omitted for conciseness. The pupil analyzer 600 may include a second beam splitter 610, a first monitoring relay mirror 620, a second monitoring relay mirror 630, and a monitoring camera 640. The second beam splitter 610 may be provided in an optical path between the mirror module 300 and the detector 500 and may reflect a portion of light provided from the mirror module 300 (and thus from the test sample 410) to the detector 500. Another portion of the light reflected by the second beam splitter 610 may be provided to the monitoring camera 640 by the first monitoring relay mirror 620 and the second monitoring relay mirror 630. The first monitoring relay mirror 620 and the second monitoring relay mirror 630 may include concave mirrors, respectively. In some embodiments, the first monitoring relay mirror 620 and the second monitoring relay mirror 630 may include flat mirrors, respectively. The monitoring camera 640 may provide visual data using collected light. The pupil analyzer 600 may measure and analyze a spot size of light formed on a pupil plane P of the light, and may change a beam spot size Bs while changing a level of a focal plane Fx of the light. In addition, the pupil analyzer 600 may monitor and change an azimuth φ of the light. Although not explicitly shown, it will be understood that the pupil analyzer 600 may further include, for example, control logic or a microprocessor coded with suitable code for measuring and analyzing the spot size and controlling the beam spot size Bs and the level of a focal plane Fx of the light, such that the azimuth φ of the light may be monitored and changed.

Figure 14A:
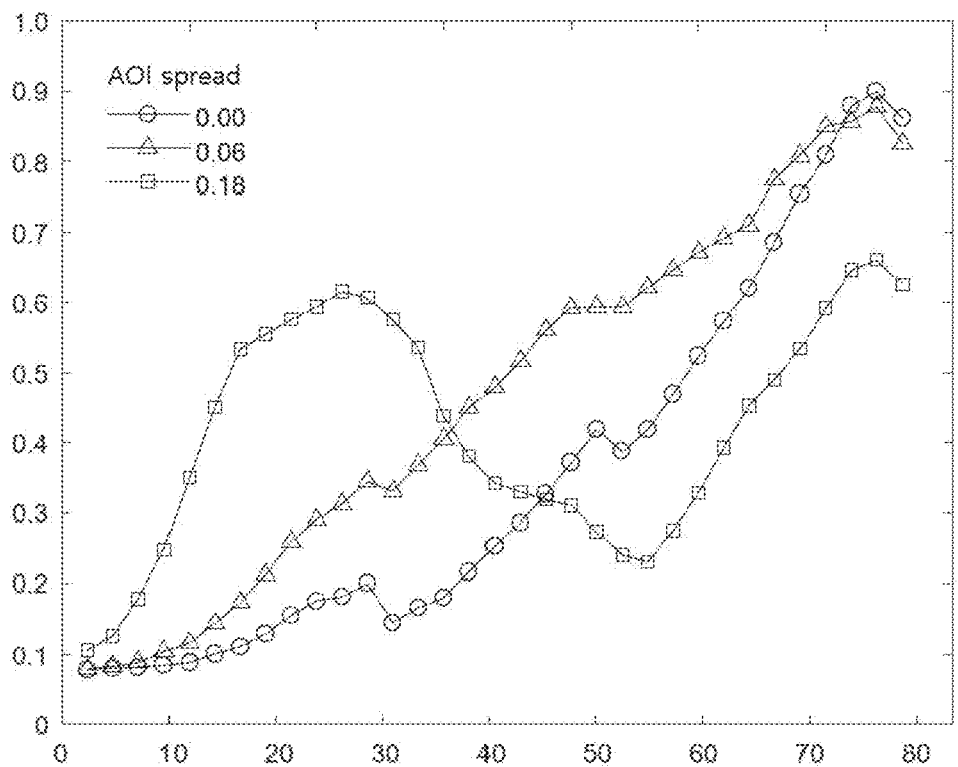
Referring to FIGS. 14A and 14B are graphs showing measurement sensitivity according to an AOI and an AOI spread of light, according to an exemplary embodiment.
Figure 14B:
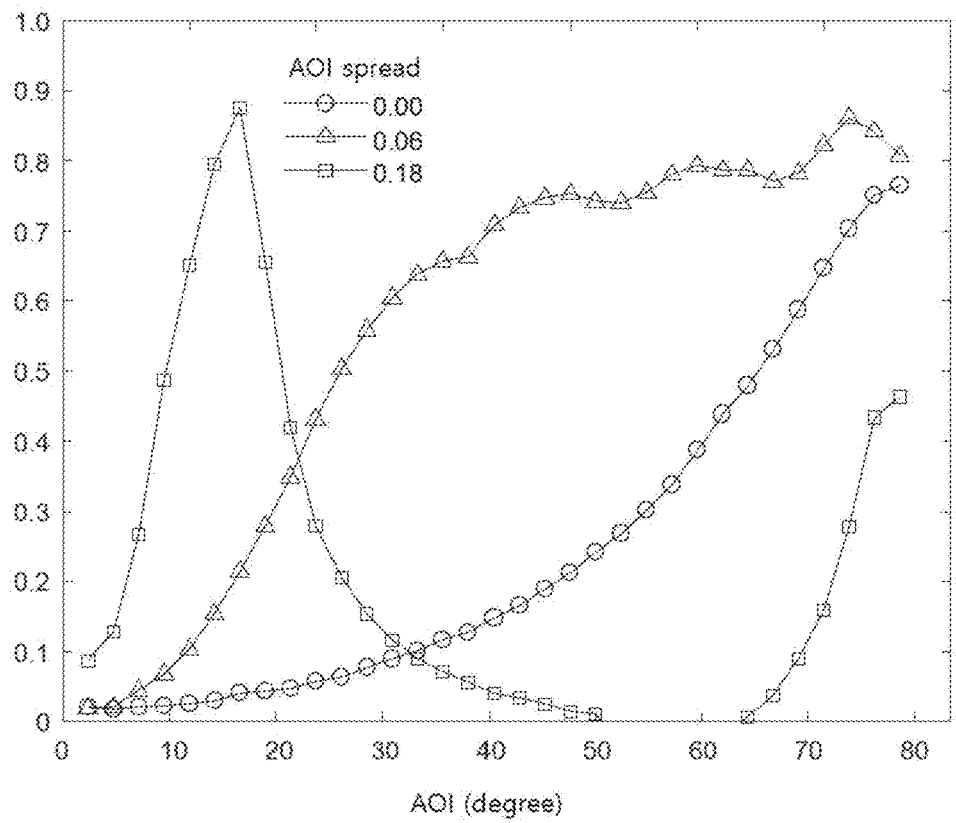

Referring to FIGS. 14A and 14B are graphs showing measurement sensitivity according to an AOI and an AOI spread of light, according to various exemplary embodiments.

FIG. 14 shows measurement sensitivity for a silicon oxide ($SiO_2$) pattern on the test sample 410, and FIG. 14B shows measurement sensitivity for a polymer organic material (for example, poly(methyl methacrylate) (PMMA)) on a silicon substrate. An X-axis represents an AOI θ, and a Y-axis represents measurement sensitivity. Variation in measurement sensitivity exhibited in cases in which light is given AOI spreads of 0.00, 0.06, and 0.18, respectively, is shown. Referring to FIG. 14A, although measurement sensitivity increases at a greater AOI, there is a section in which superior measurement sensitivity is exhibited at a specific AOI spread even when the AOI is small. For example, under the condition that the AOI spread is 0.18, high measurement sensitivity is exhibited when the AOI is about 26°. In addition, referring to FIG. 14B, under the condition that the AOI spread is 0.18, high measurement sensitivity is exhibited when the AOI is about 17°. Referring to FIGS. 14A and 14B, it can be seen that it may be possible to secure high measurement sensitivity even when the AOI of light is small, through control of the AOI spread. Consequently, it can be seen that there may be an appropriate AOI exhibiting superior measurement sensitivity in accordance with the material of the pattern and the AOI spread.

Figure 15A:
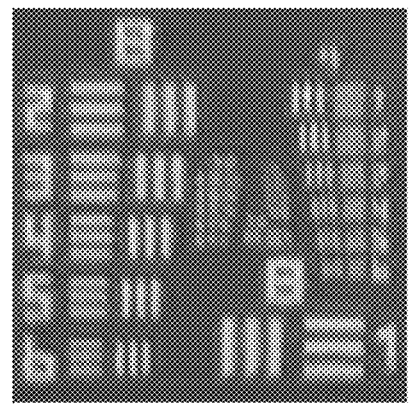
FIGS. 15A to 15C are photographs showing a method for acquiring an image having superior contrast, according to an exemplary embodiment.
Figure 15B:
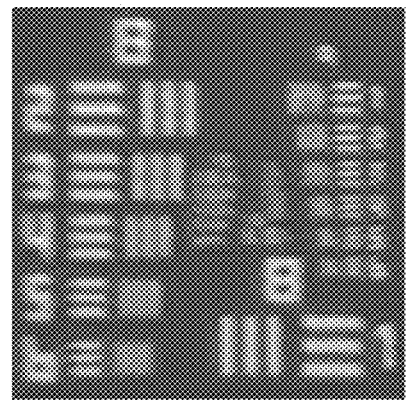
Figure 15C:
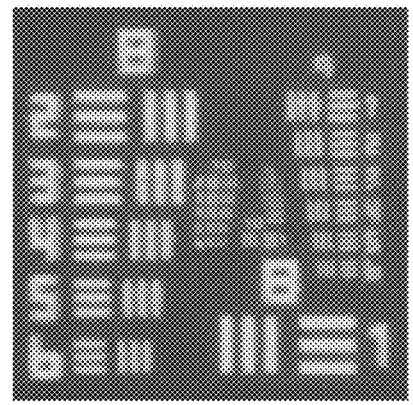

FIGS. 15A to 15C are photographs showing a method for acquiring an image having superior contrast, according to various exemplary embodiments.

FIG. 15A is an image at an azimuth of 0°. FIG. 15B is an image at an azimuth of 90°. FIG. 15C is an image obtained through synthesis of the two images. Referring to FIG. 15A, when an azimuth of light is 0°, that is, when the light is incident in a row direction, image contrast in the row direction is superior, but image contrast in a column direction is inferior. Referring to FIG. 15B, when an azimuth of light is 90°, that is, when the light is incident in the column direction, image contrast in the column direction is superior, but image contrast in the row direction is inferior.

Referring to FIG. 15C, when the image in the case of the azimuth of 0° and the image in the case of the azimuth of 90° are synthesized, it may be possible to combine advantages of the two images and, as such, an image having relatively high contrast may be acquired. Accordingly, when first measurement data and a first measurement image are acquired by performing a first measurement process at an azimuth of 0°, second measurement data and a second measurement image are acquired by performing a second measurement process at an azimuth of 90°, and the acquired measurement data and the acquired measurement images are synthesized, final measurement data and a final measurement image may be acquired. Although not explicitly shown, it will be understood that, for example, control logic or a microprocessor coded with suitable code may be provided for synthesizing the measurement data and the acquired measurement images to obtain the final measurement data and the final measurement image. In an embodiment, it may be possible to obtain an image having superior contrast by performing a plurality of measurement processes (image capture processes) having various azimuths, and synthesizing images acquired through the measurement processes.

In other embodiments, azimuths may be variously combined. For example, final measurement data and a final measurement image may be obtained by performing measurement processes at a first azimuth of 45° and a second azimuth of 135°, respectively. In an embodiment, the first azimuth and the second azimuth may have a difference of 90° from each other.

In all embodiments, the positions of the beam control mirrors 241 and 242 and the functions, positions, and shapes of the relay mirrors 251 and 252 may be interchanged. For example, the beam control mirrors 241 and 242 may be disposed between respective relay mirrors 251 and 252 and the lens module 300.

In accordance with the exemplary embodiments of the disclosure, it may be possible to acquire optimum measurement process conditions, best measurement data, and superior images by variously adjusting and combining an AOI, an AOI spread and an azimuth of light.

In accordance with the exemplary embodiments of the disclosure, it may be possible to estimate optimum process conditions by adjusting an AOI, an AOI spread and an azimuth of light in an imaging spectral ellipsometry process.

In accordance with the exemplary embodiments of the disclosure, it may be possible to embody an image spectral ellipsometry process having superior spectral sensitivity and superior image resolution.

In accordance with the exemplary embodiments of the disclosure, a reflective optical system embodied using mirrors without using a lens is used and, as such, chromatic aberration caused by a lens may be eliminated.

While the various embodiments of the disclosure have been described with reference to the accompanying drawings, it should be understood by those skilled in the art that various modifications may be made without departing from the scope of the disclosure and without changing essential features thereof. Therefore, the above-described embodiments should be considered in a descriptive sense only and not for purposes of limitation.

What is claimed is:

1. A measurement system comprising:
   an illumination module comprising a light source, an optical fiber, a collimating mirror, a polarization state generator, a beam control mirror, and a concave relay mirror;
   a mirror module comprising a first beam splitter and a reflective objective mirror;
   a stage; and
   a detector,
   wherein the optical fiber includes a core having a diameter that sets an angle-of-incidence spread of light received from the light source, and relays the light to the collimating mirror,
   wherein the concave relay mirror reflects light received from the beam control mirror onto the mirror module and the beam control mirror is movable to relay light received from the polarization state generator to a plurality of positions on the concave relay mirror, such that the beam control mirror and the concave relay mirror in combination adjust an angle of incidence of the light onto the stage, and
   wherein the reflective objective mirror comprises a convex mirror and a concave mirror having an opening formed at a center of the concave mirror and, when viewed in a top view, the concave mirror has a disc shape and the convex mirror has a circular shape, such that the beam control mirror, the concave relay mirror, the convex mirror and the concave mirror in combination adjust an azimuth of the light incident upon the stage from the mirror module.

2. The measurement system according to claim 1, wherein the collimating mirror converts light received from the light source into straight light, and provides the straight light to the polarization state generator.

3. The measurement system according to claim 1, wherein the beam control mirror and the concave relay mirror in combination converts straight light into focal light.

4. The measurement system according to claim 1, wherein the beam control mirror comprises a flat mirror which is swingable or semi-rotatable.

5. The measurement system according to claim 1, wherein the beam control mirror comprises a concave mirror which is movable in forward and rearward directions, left and right directions, and upward and downward directions.

6. The measurement system according to claim 1, wherein:
   the polarization state generator comprises a polarizer and a compensator;
   the polarizer primarily polarizes the light received from the collimating mirror to convert the light into linearly polarized light; and
   the compensator secondarily polarizes the linearly polarized light to convert the linearly polarized light into elliptically polarized light.

7. The measurement system according to claim 1, wherein:
   the illumination module further comprises a transparent swing panel between the polarization state generator and the beam control mirror; and
   the transparent swing panel provides light provided from the polarization state generator to various positions on the beam control mirror.

8. The measurement system according to claim 1, wherein the convex mirror is disposed at a lower side of the concave mirror in a direction of incidence of light from the first beam splitter and is upwardly convex, and the concave mirror is disposed at an upper side of the convex mirror and is downwardly concave.

9. The measurement system according to claim 8, wherein:
   a first half portion of the convex mirror receives light passing through the opening of the concave mirror, and reflects the received light onto a first half portion of the concave mirror;

the first half portion of the concave mirror provides, onto the stage, the light reflected from the first half portion of the convex mirror;

a second half portion of the concave mirror receives light reflected from the stage, and reflects the received light to a second half portion of the convex mirror; and the second half portion of the convex mirror reflects the light reflected from the second half portion of the concave mirror such that the light is outwardly reflected through the opening.

10. The measurement system according to claim 1, wherein:

the measurement system further comprises a pupil analyzer including a second beam splitter, a monitoring relay mirror, and a monitoring camera, and the second beam splitter is disposed in an optical path between the mirror module and the detector.

11. The measurement system according to claim 1, wherein:

the detector comprises a polarization state analyzer, an imaging mirror, and an imaging camera; and the polarization state analyzer comprises a polarizer and a compensator.

12. The measurement system according to claim 1, wherein a first optical path from the light source to the stage includes, in order, the optical fiber, the collimating mirror, the polarization state generator, the beam control mirror, the concave relay mirror, the first beam splitter, and the reflective objective mirror, and wherein a second optical path from the stage to the detector includes, in order, the reflective objective mirror and the first beam splitter.

13. A measurement system comprising:

an illumination module comprising a light source, an optical fiber, a collimating mirror, a polarization state generator, a beam control mirror, and a concave relay mirror;

a mirror module comprising a beam splitter and a reflective objective mirror;

a stage; and a detector, wherein the light source generates light, and provides the light to the collimating mirror via the optical fiber, the optical fiber includes a core having a diameter that sets an angle-of-incidence spread of light received from the light source, and relays the light to the collimating mirror, the collimating mirror converts the light received from the light source into straight light, and provides the straight light to the polarization state generator, the polarization state generator polarizes the straight light received from the collimating mirror, and provides the polarized light to the beam control mirror, the concave relay mirror reflects light received from the beam control mirror onto the mirror module and the beam control mirror is movable to relay the polarized light received from the polarization state generator to a plurality of positions on the concave relay mirror, such that the beam control mirror and the concave relay mirror in combination convert the polarized light received from the polarization state generator into focal light, provide the focal light to the mirror module to adjust an angle of incidence of the focal light onto the stage, and the reflective objective mirror comprises a convex mirror and a concave mirror having an opening formed at a center of the concave mirror and, when viewed in a top view, the concave mirror has a disc shape and the convex mirror has a circular shape, such that the beam control mirror, the concave relay mirror, the convex mirror and the concave mirror in combination adjust an azimuth of the light incident upon the stage from the mirror module.

14. The measurement system according to claim 13, wherein the reflective objective mirror and the stage are movable to adjust the angle of incidence and an azimuth of light incident upon the stage from the mirror module.

15. The measurement system according to claim 13, wherein a first optical path from the light source to the stage includes, in order, the optical fiber, the collimating mirror, the polarization state generator, the beam control mirror, the concave relay mirror, the beam splitter, and the reflective objective mirror, and wherein a second optical path from the stage to the detector includes, in order, the reflective objective mirror and the beam splitter.

16. A measurement system comprising:

an illumination module comprising a light source, an optical fiber, a collimating mirror, a polarization state generator, a beam control mirror, and a concave relay mirror;

a mirror module comprising a beam splitter and a reflective objective mirror, the reflective objective mirror comprising a convex mirror and a concave mirror and the convex mirror is below the concave mirror in a direction of incidence of light from the beam splitter and, when viewed in a top view, the concave mirror has a disc shape and the convex mirror has a circular shape;

a stage; and a detector, wherein the light source generates light, and provides the light to the optical fiber, the optical fiber includes a core having a diameter that sets an angle-of-incidence spread of the light, and the optical fiber provides the light to the collimating mirror, the collimating mirror converts the light into straight light, and provides the straight light to the polarization state generator, the polarization state generator polarizes the straight light received from the collimating mirror, and provides the polarized light to the beam control mirror, the concave relay mirror reflects light received from the beam control mirror onto the mirror module, the beam control mirror is movable to relay the polarized light to the concave relay mirror to a plurality of positions on the concave relay mirror such that the beam control mirror and the concave relay mirror in combination convert the polarized light into focal light, and provide the focal light to the beam splitter of the mirror module; to adjust an angle of incidence of the focal light onto the stage, the beam splitter provides the light received from the illumination module to the reflective objective mirror, such that the beam control mirror, the concave relay mirror, the convex mirror and the concave mirror in combination adjust an azimuth of the light incident upon the stage from the mirror module, a first half portion of the convex mirror and a first half portion of the concave mirror exclusively provide light received from the illumination module to the stage, and a second half portion of the convex mirror and a second half portion of the concave mirror exclusively reflect, onto the detector, light reflected from the stage.

17. The measurement system according to claim 16,
wherein a first optical path from the light source to the stage includes, in order, the optical fiber, the collimating mirror, the polarization state generator, the beam control mirror, the concave relay mirror, the beam splitter, the first half portion of the convex mirror and the first half portion of the concave mirror, and
wherein a second optical path from the stage to the detector includes, in order, the second half portion of the convex mirror and the second half portion of the concave mirror and the beam splitter.

\* \* \* \* \*